United States Patent
Chen et al.

(10) Patent No.: US 12,309,849 B2
(45) Date of Patent: May 20, 2025

(54) DATA TRANSMISSION METHOD AND APPARATUS

(71) Applicant: Huawei Technologies Co., Ltd., Shenzhen (CN)

(72) Inventors: Lei Chen, Beijing (CN); Bingzhao Li, Beijing (CN); Hong Wang, Beijing (CN); Bin Xu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 585 days.

(21) Appl. No.: 17/457,548

(22) Filed: Dec. 3, 2021

(65) Prior Publication Data
US 2022/0095389 A1 Mar. 24, 2022

Related U.S. Application Data

(63) Continuation of application No. PCT/CN2020/091652, filed on May 21, 2020.

(30) Foreign Application Priority Data

Jun. 6, 2019 (CN) .......................... 201910490937.4

(51) Int. Cl.
*H04W 74/0833* (2024.01)
*H04W 72/02* (2009.01)
(Continued)

(52) U.S. Cl.
CPC ....... *H04W 74/0841* (2013.01); *H04W 72/02* (2013.01); *H04W 72/0446* (2013.01); *H04W 74/0866* (2013.01)

(58) Field of Classification Search
CPC ............. H04W 74/0841; H04W 72/02; H04W 72/0446; H04W 74/0866; H04W 72/21;
(Continued)

(56) References Cited

U.S. PATENT DOCUMENTS 11,924,886 B2 * 3/2024 Ratasuk ............ H04W 74/0841
2019/0159257 A1 * 5/2019 Rico Alvarino ...... H04L 1/0003
(Continued)

FOREIGN PATENT DOCUMENTS

WO 2018174577 A1 9/2018
WO 109586878 A 4/2019
(Continued)

OTHER PUBLICATIONS

Blankenship et al., "Wireless Transmission with Aggregation Factor", U.S. Appl. No. 62/739,026, filed Sep. 28, 2018 (Year: 2018).*
(Continued)

*Primary Examiner* — Thinh D Tran
(74) *Attorney, Agent, or Firm* — Slater Matsil, LLP

(57) ABSTRACT

A method includes that a terminal receives first indication information from a network device, where the first indication information is used for early data transmission, and the first indication information includes slot aggregation information of a physical uplink shared channel PUSCH in a random access procedure; and the terminal performs early data transmission based on the first indication information. Slot aggregation of a PUSCH is used to implement early data transmission of a large data packet.

18 Claims, 4 Drawing Sheets

(51) Int. Cl.
*H04W 72/0446* (2023.01)
*H04W 74/08* (2009.01)

(58) Field of Classification Search
CPC .............. H04W 72/23; H04W 74/008; H04W 74/0833; H04W 74/004
See application file for complete search history.

(56) References Cited

U.S. PATENT DOCUMENTS

| | | | | |
|---|---|---|---|---|
| 2019/0208411 | A1* | 7/2019 | Shrestha | H04L 9/0861 |
| 2019/0342921 | A1* | 11/2019 | Loehr | H04L 5/0053 |
| 2020/0383085 | A1* | 12/2020 | Shih | H04W 72/1268 |
| 2021/0153032 | A1* | 5/2021 | Li | H04W 74/0833 |
| 2021/0352617 | A1* | 11/2021 | Choe | H04L 1/16 |
| 2021/0360730 | A1* | 11/2021 | Kim | H04W 74/0833 |
| 2022/0006595 | A1* | 1/2022 | Blankenship | H04W 72/23 |
| 2022/0046421 | A1* | 2/2022 | Shrestha | H04W 12/106 |

FOREIGN PATENT DOCUMENTS

| | | | |
|---|---|---|---|
| WO | 2019062928 | A1 | 4/2019 |
| WO | 2019099087 | A1 | 5/2019 |

OTHER PUBLICATIONS

Ericsson: "TB sizes and UL grant for Msg3", 3GPP TSG-RAN WG2 #101bis, Draft; R2-1805178, Sanya, P.R. of China; Apr. 16-20, 2018, XP051415873, total 12 pages.
Huawei et al: "Feature lead summary of EOT during RACH in feNB-IoT" 3GPP TSG WG1 Meeting #93, Draft; R1-1807473, Busan, Korea; May 21-25, 2018, XP051463163, total 15 pages.

* cited by examiner

DATA TRANSMISSION METHOD AND APPARATUS

CROSS-REFERENCE TO RELATED APPLICATIONS

This application is a continuation of International Application No. PCT/CN2020/091652, filed on May 21, 2020, which claims priority to Chinese Patent Application No. 201910490937.4, filed on Jun. 6, 2019. The disclosures of the aforementioned applications are hereby incorporated by reference in their entireties.

TECHNICAL FIELD

Embodiments of this application relate to the field of communication technologies, and in particular, to a data transmission method and apparatus.

BACKGROUND

In conventional communication technologies, when no downlink data of a terminal needs to be transmitted on a network side, a radio resource control (RRC) connection is not established between a base station and the terminal. In this case, the terminal is in an idle state, that is, an IDLE state. When the terminal needs to transmit data to a network device, the terminal needs to establish an RRC connection to the network device, and enters a connected state from the idle state. However, a process of establishing the RRC connection requires interaction of a plurality of pieces of signaling.

For some communication scenarios such as machine type communication (MTC) and narrowband internet of things (NB-IoT), data transmission is characterized by a small data amount. The terminal usually needs to frequently send some small data packets. If a small data packet with a small data amount is transmitted according to the foregoing data transmission method, the terminal frequently establishes RRC connections. Consequently, utilization efficiency of radio resources is reduced, a large quantity of resources are used for an RRC connection establishment procedure, and a small quantity of resources are used for data transmission. Based on this, an early data transmission (EDT) technology is proposed. The EDT technology enables a terminal to transmit an uplink small data packet or receive a downlink small data packet without entering the connected state.

In a long term evolution (LTE) system, enhanced coverage (EC) or coverage enhancement (CE) is used to meet a signal receiving requirement of a terminal of an MTC type or an NB-IoT type. A main method for implementing enhanced coverage is to repeatedly send a signal for a plurality of times, to improve a data receiving success rate through a plurality of times of receiving and combination. By using the enhanced coverage technology, a data packet may be repeatedly sent for a plurality of times. In this way, a size of a data packet of EDT transmission in an LTE system may reach several hundred bits. However, a new radio (NR) communication system does not support repeated sending of a data packet. At a cell edge location, a maximum size of a data packet of early data transmission that is carried in a random access procedure is 56 bits, which cannot meet an EDT transmission requirement of an NR system.

SUMMARY

This application provides a downlink data transmission method and apparatus, to resolve a problem that an EDT transmission requirement of an NR communication system cannot be met.

Specific technical solutions provided in embodiments of this application are as follows.

According to a first aspect, a data transmission method is provided. The method is implemented in the following steps: A terminal receives first indication information from a network device, where the first indication information is used for early data transmission, and the first indication information includes slot aggregation information of a physical uplink shared channel PUSCH in a random access procedure; and the terminal performs early data transmission based on the first indication information. The terminal may send the PUSCH in the random access procedure based on the slot aggregation information that is of the PUSCH in the random access procedure and that is in the indication information, where the PUSCH carries uplink data of the early data transmission. In this way, a larger size of a data packet of the early data transmission is supported through slot aggregation of the PUSCH. When the data packet of the early data transmission is small, slot aggregation of the PUSCH may not be used, thereby avoiding a waste of resources. When the data packet of the early data transmission is large, slot aggregation of the PUSCH is used to better implement the early data transmission of the large data packet.

In a possible design, the terminal includes uplink data in the random access procedure to implement the early data transmission.

In a possible design, the first indication information includes at least one of the following information: whether the network device supports slot aggregation of the PUSCH in the random access procedure, at least one slot aggregation level that is of the PUSCH in the random access procedure and that is supported by the network device, random access configuration information, and a first transport block size TBS. The TBS is used to indicate a maximum data volume of uplink data that is of the early data transmission and that is allowed to be included by the terminal at one time in the random access procedure.

In a possible design, the random access configuration information includes at least one of the following information: preamble information and/or random access channel resource information that correspond/corresponds to each of the at least one slot aggregation level, and preamble information and/or random access channel resource information that correspond/corresponds to a case in which slot aggregation is not performed for the PUSCH in the random access procedure.

In a possible design, the terminal selects preamble information and/or random access channel resource information that are/is used for the random access procedure, where if a size of first uplink data of the early data transmission is not greater than the first TBS, the terminal selects, for the random access procedure, the preamble information and/or the random access channel resource information that correspond/corresponds to the case in which slot aggregation is not performed for the PUSCH in the random access procedure; or if a size of first uplink data of the early data transmission is greater than the first TBS, less than a product of the first TBS and a first slot aggregation level, and less than a product of the first TBS and a second slot aggregation level, the terminal selects, for the random access procedure, first preamble information and/or first random access channel resource information that correspond/corresponds to the first slot aggregation level, where the at least one slot aggregation level includes the first slot aggregation level and the second slot aggregation level, and the first slot aggregation level is less than the second slot aggregation level. In this way, when the data packet of the early data transmission is small, slot aggregation of the PUSCH may not be used, thereby avoiding a waste of resources. When the data packet of the early data transmission is large, slot aggregation of the PUSCH is used to better implement the early data transmission of the large data packet.

In a possible design, the terminal sends, to the network device on a resource selected by the terminal for the random access procedure, the preamble information selected by the terminal for the random access procedure. In this way, the terminal can notify the network device of a corresponding slot aggregation level by using the resource and/or the preamble information in the random access procedure. Therefore, the network device can learn that normal transmission of the uplink data sent by the terminal in this time of early data transmission needs to be completed by using a proper slot aggregation level, and allocates an uplink resource for the terminal based on the slot aggregation level, to implement the early data transmission.

In a possible design, the terminal receives random access response information from the network device, where the random access response information includes at least one of uplink data transmission grant information, timing advance information, a temporary cell radio network temporary identifier, and information used to indicate whether the early data transmission is allowed. In this way, the terminal can perform, based on information in the random access response and on the resource allocated by the network device, the early data transmission of the uplink data in a slot aggregation manner or not in the slot aggregation manner based on the slot aggregation level corresponding to the preamble and/or the random access channel resource, to implement an early data transmission procedure.

In a possible design, the terminal sends the first uplink data of the early data transmission to the network device based on the uplink data transmission grant information. In this way, the uplink data is carried in the random access procedure, and therefore, the early data transmission procedure is implemented.

In a possible design, the first indication information further includes at least one of an area level and a parameter for performing area level classification based on signal qualities of a cell; the at least one slot aggregation level that is of the PUSCH in the random access procedure and that is supported by the network device includes at least one slot aggregation level that is of the PUSCH in the random access procedure and that is supported by the network device at different area levels, the random access configuration information includes random access configuration information at different area levels, and the first TBS includes first transport block sizes TBSs at different area levels; and the terminal determines an area level of the terminal based on a signal quality of the cell in which the terminal is located, and further determines slot aggregation information, a TBS, and random access configuration information at the area level. Through area level classification, a parameter related to slot aggregation can be determined with reference to a feature of qualities of communication between the terminal and the network device at different area levels and a feature of TBSs supported at different area levels, and therefore a proper slot aggregation level or the case in which slot aggregation is not performed is selected. In this way, early data transmission with a better transmission quality is completed.

According to a second aspect, a data transmission method is provided. The method is implemented in the following manner: A terminal receives first indication information and second indication information from a network device, where the first indication information is used to indicate to perform early data transmission on a first uplink carrier, and the second indication information is used to indicate to perform early data transmission on a second uplink carrier; and the terminal performs early data transmission on the first uplink carrier or the second uplink carrier. The first indication information and the second indication information are used to indicate early data transmission on different uplink carriers, so that proper early data transmission solutions may be selected for the two uplink carriers. Usually, an uplink carrier with a lower frequency can be used to transmit data with a larger TBS compared with an uplink carrier with a higher frequency. In this way, a larger amount of data can be transmitted in an early data transmission process. If the uplink carrier with the high frequency cannot meet a requirement of the early data transmission, the uplink carrier with the low frequency may be selected. This helps implement the early data transmission in a communication system, and helps transmit a larger amount of data of the early data transmission.

Optionally, the first indication information and the second indication information may be carried in a same message, or may be carried in different messages.

In a possible design, the first indication information includes first random access configuration information and/or a first transport block size TBS, and the second indication information includes second random access configuration information and/or a second TBS. The terminal can determine an early data transmission manner for the first uplink carrier based on the first random access configuration information and/or the first transport block size TBS, so that the early data transmission can be better implemented. The terminal can determine an early data transmission manner for the second uplink carrier based on the second random access configuration information and/or the second transport block size TBS, so that the early data transmission can be better implemented. Therefore, the early data transmission is implemented when two uplink carriers are used for the communication system.

In a possible design, the first indication information includes at least one of the following information: whether the network device supports slot aggregation of a PUSCH in a random access procedure on the first uplink carrier, and at least one first slot aggregation level that is of the PUSCH in the random access procedure and that is supported by the network device; and the second indication information includes at least one of the following information: whether the network device supports slot aggregation of the PUSCH in a random access procedure on the second uplink carrier, and at least one second slot aggregation level that is of the PUSCH in the random access procedure and that is supported by the network device. The terminal can determine the early data transmission manner for the first uplink carrier based on content indicated by the first indication information, so that the early data transmission can be better implemented. The terminal can determine the early data transmission manner for the second uplink carrier based on content indicated by the second indication information, so that the early data transmission can be better implemented. In this way, the early data transmission can be better implemented by using the two uplink carriers and slot aggregation, and transmission of a larger amount of data of the early data transmission can be supported.

In a possible design, the first random access configuration information includes at least one of the following information: preamble information and/or random access channel resource information that correspond/corresponds to each of the at least one first slot aggregation level, and preamble information and/or random access channel resource information that correspond/corresponds to a case in which slot aggregation is not performed for the PUSCH in the random access procedure; and the second random access configuration information includes at least one of the following information: preamble information and/or random access channel resource information that correspond/corresponds to each of the at least one second slot aggregation level, and preamble information and/or random access channel resource information that correspond/corresponds to a case in which slot aggregation is not performed for the PUSCH in the random access procedure. The terminal can determine, based on the first random access configuration information, some parameters used when the early data transmission is implemented by performing random access on the first uplink carrier, so that the early data transmission can be better implemented. The terminal can determine, based on the second random access configuration information, some parameters used when the early data transmission is implemented by performing random access on the second uplink carrier, so that the early data transmission can be better implemented. Therefore, the early data transmission is implemented when two uplink carriers are used for the communication system. The first indication information and the second indication information indicate information related to slot aggregation. The terminal may send the PUSCH in the random access procedure based on slot aggregation information that is of the PUSCH in the random access procedure and that is in the first indication information or the second indication information, where the PUSCH carries uplink data of the early data transmission. In this way, a larger size of a data packet of the early data transmission is supported through slot aggregation of the PUSCH.

In a possible design, the terminal determines an uplink carrier for random access according to one of the following methods: if determining that a downlink reference signal quality exceeds a threshold and a size of uplink data of the early data transmission is greater than the first TBS but less than a product of the first TBS and the first slot aggregation level, selecting the first uplink carrier for random access; or if determining that a downlink reference signal quality exceeds a threshold and a size of uplink data of the early data transmission is greater than a product of the first TBS and the first slot aggregation level but less than a product of the second TBS and the second slot aggregation level, selecting the second uplink carrier for random access. In this way, with reference to a size of the data packet of the early data transmission and features of the two uplink carriers, a proper uplink carrier may be selected to perform the early data transmission, and a proper slot aggregation solution is selected for the proper uplink carrier, so that the early data transmission can be better implemented by using the uplink carrier and slot aggregation, and transmission of a larger amount of data of the early data transmission can be supported. For example, when the proper uplink carrier is selected, if the data packet of the early data transmission is small, slot aggregation of the PUSCH may not be used, thereby avoiding a waste of resources; if the data packet of the early data transmission is large, slot aggregation of the PUSCH is used to better implement the early data transmission of the large data packet.

In a possible design, the method further includes: The terminal determines an uplink carrier for random access according to one of the following methods: if determining that a downlink reference signal quality exceeds a threshold, selecting the first uplink carrier for random access; if determining that a downlink reference signal quality does not exceed a threshold, selecting the second uplink carrier for random access; if determining that a downlink reference signal quality exceeds a threshold and a size of uplink data of the early data transmission is not greater than the first TBS, selecting the first uplink carrier for random access; if determining that a downlink reference signal quality exceeds a threshold and a size of uplink data of the early data transmission is greater than the first TBS and not greater than the second TBS, selecting the second uplink carrier for random access; if determining that a size of uplink data of the early data transmission is not greater than the first TBS and not greater than the second TBS, where the second TBS is greater than the first TBS, selecting the second uplink carrier for random access; or preferentially selecting the second uplink carrier for random access. In this way, with reference to a size of the data packet of the early data transmission and features of the two uplink carriers, a proper uplink carrier may be selected to perform the early data transmission, and a proper early data transmission solution is selected for the proper uplink carrier. When the TBS supported by the uplink carrier with the higher frequency can be used for carrying the uplink data of the early data transmission, the uplink carrier with the higher frequency is selected for the data transmission. Because a spectrum of the carrier with the higher frequency is wider, the early data transmission can be performed more effectively. When the TBS supported by the uplink carrier with the higher frequency cannot be used for carrying the uplink data of the early data transmission, because the uplink carrier with the lower frequency can support a larger TBS, the uplink carrier with the lower frequency can be selected for the early data transmission. Because fading of a low-frequency signal is large, better transmission efficiency can be achieved by performing the early data transmission on an uplink carrier with a low frequency.

In a possible design, the terminal implements the early data transmission in the random access procedure. Specifically, a process of performing the early data transmission on the first uplink carrier is: The terminal sends a random access preamble to the network device on the first uplink carrier based on the first indication information; the terminal receives a random access response from the network device; and the terminal sends the PUSCH to the network device on the first uplink carrier based on the first indication information, where the PUSCH carries the uplink data of the early data transmission. A process of performing the early data transmission on the second uplink carrier is: The terminal sends a random access preamble to the network device on the second uplink carrier based on the second indication information; the terminal receives a random access response from the network device; and the terminal sends the PUSCH to the network device on the second uplink carrier based on the second indication information, where the PUSCH carries the uplink data of the early data transmission.

The following describes possible designs of performing the early data transmission on the first uplink carrier or the second uplink carrier.

In a possible design, the terminal sends, to the network device on a resource selected by the terminal for the random access procedure, preamble information selected by the terminal for the random access procedure. In this way, the terminal can notify the network device of a corresponding slot aggregation level by using the resource and/or the preamble information in the random access procedure. Therefore, the network device can learn that normal transmission of the uplink data sent by the terminal in this time of early data transmission needs to be completed by using a proper slot aggregation level, and allocates an uplink resource for the terminal based on the slot aggregation level, to implement the early data transmission.

In a possible design, the terminal receives random access response information from the network device, where the random access response information includes at least one of uplink data transmission grant information, timing advance information, a temporary cell radio network temporary identifier, and information used to indicate whether the early data transmission is allowed. In this way, the terminal can perform, based on information in the random access response and on the resource allocated by the network device, the early data transmission of the uplink data in a slot aggregation manner or not in the slot aggregation manner based on the slot aggregation level corresponding to the preamble and/or the random access channel resource, to implement an early data transmission procedure.

In a possible design, the terminal sends the first uplink data of the early data transmission to the network device based on the uplink data transmission grant information. The uplink data transmission grant information may include information about slot aggregation of the PUSCH. In this way, the uplink data is carried in the random access procedure, and therefore, the early data transmission procedure is implemented.

The foregoing several possible designs are applicable to early data transmission on the first uplink carrier and early data transmission on the second uplink carrier.

In a possible design, the first indication information further includes at least one of the following information for the first uplink carrier: an area level and a parameter for performing area level classification based on signal qualities of a cell; the first random access configuration information includes first random access configuration information at different area levels; and the first TBS includes first TBSs at different area levels; the second indication information further includes at least one of the following information for the second uplink carrier: an area level and a parameter for performing area level classification based on signal qualities of the cell; the second random access configuration information includes second random access configuration information at different area levels; and the second TBS includes second TBSs at different area levels; and the terminal determines an area level of the terminal based on a signal quality of the cell in which the terminal is located, and further determines a TBS and random access configuration information at the area level. Through area level classification, a proper uplink carrier can be selected for the early data transmission with reference to a feature of qualities of communication between the terminal and the network device at different area levels and a feature of TBSs supported at different area levels.

In a possible design, the first indication information further includes at least one of the following information for the first uplink carrier: an area level and a parameter for performing area level classification based on signal qualities of a cell; the second indication information further includes at least one of the following information for the second uplink carrier: an area level and a parameter for performing area level classification based on signal qualities of the cell; the at least one first slot aggregation level that is of the PUSCH in the random access procedure and that is supported by the network device includes at least one first slot aggregation level that is of the PUSCH in the random access procedure and that is supported by the network device at different area levels; the at least one second slot aggregation level that is of the PUSCH in the random access procedure and that is supported by the network device includes at least one second slot aggregation level that is of the PUSCH in the random access procedure and that is supported by the network device at different area levels; and the terminal determines an area level of the terminal based on a signal quality of the cell in which the terminal is located, and further determines slot aggregation information, a TBS, and random access configuration information at the area level. Through area level classification, a parameter related to slot aggregation can be determined with reference to a feature of qualities of communication between the terminal and the network device at different area levels and a feature of TBSs supported at different area levels, and therefore a proper slot aggregation level or the case in which slot aggregation is not performed is selected. In this way, early data transmission with a better transmission quality is completed.

According to a third aspect, a data transmission method is provided. The method is implemented in the following steps: A network device sends first indication information to a terminal, where the first indication information is used for early data transmission, and the first indication information includes slot aggregation information of a physical uplink shared channel PUSCH in a random access procedure; and the network device receives uplink data sent by the terminal in the random access procedure. In this way, with the first indication information, the terminal may send the PUSCH in the random access procedure based on the slot aggregation information that is of the PUSCH in the random access procedure and that is in the first indication information, where the PUSCH carries the uplink data of early data transmission. In this way, a larger size of a data packet of the early data transmission is supported through slot aggregation of the PUSCH. When the data packet of the early data transmission is small, slot aggregation of the PUSCH may not be used, thereby avoiding a waste of resources. When the data packet of the early data transmission is large, slot aggregation of the PUSCH is used to better implement the early data transmission of the large data packet.

In a possible design, the first indication information includes at least one of the following information: whether the network device supports slot aggregation of the PUSCH in the random access procedure, at least one slot aggregation level that is of the PUSCH in the random access procedure and that is supported by the network device, random access configuration information, and a first transport block size TBS. The TBS is used to indicate a maximum data volume of uplink data that is of the early data transmission and that is allowed to be included by the terminal at one time in the random access procedure.

In a possible design, the random access configuration information includes at least one of the following information: preamble information and/or random access channel resource information that correspond/corresponds to each of the at least one slot aggregation level, and preamble information and/or random access channel resource information that correspond/corresponds to a case in which slot aggregation is not performed for the PUSCH in the random access procedure.

In a possible design, the network device receives a random access preamble from the terminal; and the network device returns a random access response to the terminal, where the random access response includes at least one of uplink data transmission grant information, timing advance information, a temporary cell radio network temporary identifier, and information used to indicate whether early data transmission is allowed. In this way, the network device can learn of a corresponding slot aggregation level by using a resource and/or preamble information in the random access procedure, can learn that normal transmission of the uplink data sent by the terminal in this time of early data transmission needs to be completed by using a proper slot aggregation level, and allocates an uplink resource for the terminal based on the slot aggregation level, to implement the early data transmission.

In a possible design, the network device determines, based on the random access preamble, at least one of the following information: the terminal needs to perform early data transmission, whether the terminal sends the PUSCH in the random access procedure in a slot aggregation manner, and a slot aggregation level used by the terminal to send the PUSCH in the random access procedure. In this way, the network device can allocate, to the terminal, an uplink resource corresponding to the random access preamble and/or a random access channel resource, to implement an early data transmission procedure.

In a possible design, the network device receives the first uplink data of the early data transmission from the terminal. In this way, the uplink data is carried in the random access procedure, and therefore, the early data transmission procedure is implemented.

In a possible design, the first indication information further includes at least one of an area level and a parameter for performing area level classification based on signal qualities of a cell; and the at least one slot aggregation level that is of the PUSCH in the random access procedure and that is supported by the network device includes at least one slot aggregation level that is of the PUSCH in the random access procedure and that is supported by the network device at different area levels, the random access configuration information includes random access configuration information at different area levels, and the first TBS includes first transport block sizes TBSs at different area levels. Through area level classification, a parameter related to slot aggregation can be determined with reference to a feature of qualities of communication between the terminal and the network device at different area levels and a feature of TBSs supported at different area levels, and therefore a proper slot aggregation level or the case in which slot aggregation is not performed is selected. In this way, early data transmission with a better transmission quality is completed.

According to a fourth aspect, a data transmission method is provided. The method is implemented in the following manner: A network device sends first indication information and second indication information to a terminal, where the first indication information is used to indicate to perform early data transmission on a first uplink carrier, and the second indication information is used to indicate to perform early data transmission on a second uplink carrier; and the network device receives, on the first uplink carrier, uplink data sent by the terminal in a random access procedure, or the network device receives, on the second uplink carrier, uplink data sent by the terminal in a random access procedure. The first indication information and the second indication information are used to indicate early data transmission on different uplink carriers, so that early data transmission solutions may be used for the two uplink carriers. Usually, an uplink carrier with a lower frequency in the two uplink carries can be used to transmit data with a larger TBS compared with an uplink carrier with a higher frequency. In this way, a larger amount of data can be transmitted in an early data transmission process. This helps implement early data transmission in a communication system with a high frequency, and helps transmit a larger amount of data of the early data transmission.

Optionally, the first indication information and the second indication information may be carried in a same message, or may be carried in different messages.

In a possible design, the first indication information includes first random access configuration information and/or a first transport block size TBS, and the second indication information includes second random access configuration information and/or a second TBS. In this way, an early data transmission manner for the first uplink carrier can be indicated to the terminal by using the first indication information, so that early data transmission can be better implemented. An early data transmission manner for the second uplink carrier can be indicated to the terminal by using the first indication information, so that early data transmission can be better implemented. Therefore, the early data transmission is implemented when two uplink carriers are used for a communication system.

In a possible design, the first indication information includes at least one of the following information: whether the network device supports slot aggregation of a PUSCH in the random access procedure on the first uplink carrier, and at least one first slot aggregation level that is of the PUSCH in the random access procedure and that is supported by the network device; and the second indication information includes at least one of the following information: whether the network device supports slot aggregation of the PUSCH in the random access procedure on the second uplink carrier, and at least one second slot aggregation level that is of the PUSCH in the random access procedure and that is supported by the network device. In this way, the early data transmission manner for the first uplink carrier can be indicated to the terminal by using the first indication information, so that the early data transmission can be better implemented. The early data transmission manner for the second uplink carrier can be indicated to the terminal by using the first indication information, so that the early data transmission can be better implemented. Therefore, the early data transmission is implemented when two uplink carriers are used for the communication system.

In a possible design, the first random access configuration information includes at least one of the following information: preamble information and/or random access channel resource information that correspond/corresponds to each of the at least one first slot aggregation level, and preamble information and/or random access channel resource information that correspond/corresponds to a case in which slot aggregation is not performed for the PUSCH in the random access procedure; and the second random access configuration information includes at least one of the following information: preamble information and/or random access channel resource information that correspond/corresponds to each of the at least one second slot aggregation level, and preamble information and/or random access channel resource information that correspond/corresponds to a case in which slot aggregation is not performed for the PUSCH in the random access procedure. In this way, some parameters used when the early data transmission is performed on the first uplink carrier are notified to the terminal by using the first random access configuration information, so that the early data transmission can be better implemented. Some parameters used when the early data transmission is performed on the second uplink carrier are notified to the terminal by using the second random access configuration information, so that the early data transmission can be better implemented. Therefore, the early data transmission is implemented when two uplink carriers are used for the communication system.

In a possible design, the first indication information further includes at least one of the following information for the first uplink carrier: an area level and a parameter for performing area level classification based on signal qualities of a cell; the first random access configuration information includes first random access configuration information at different area levels; and the first TBS includes first TBSs at different area levels; and the second indication information further includes at least one of the following information for the second uplink carrier: an area level and a parameter for performing area level classification based on signal qualities of the cell; the second random access configuration information includes second random access configuration information at different area levels; and the second TBS includes second TBSs at different area levels. In this way, with reference to a size of a data packet of the early data transmission and features of the two uplink carriers, a proper uplink carrier may be selected to perform the early data transmission, and a proper slot aggregation solution is selected for the proper uplink carrier, so that the early data transmission can be better implemented by using the uplink carrier and slot aggregation, and transmission of a larger amount of data of the early data transmission can be supported. For example, when the proper uplink carrier is selected, if the data packet of the early data transmission is small, slot aggregation of the PUSCH may not be used, thereby avoiding a waste of resources; if the data packet of the early data transmission is large, slot aggregation of the PUSCH is used to better implement the early data transmission of the large data packet.

In a possible design, the first indication information further includes at least one of the following information for the first uplink carrier: an area level and a parameter for performing area level classification based on signal qualities of a cell; the second indication information further includes at least one of the following information for the second uplink carrier: an area level and a parameter for performing area level classification based on signal qualities of the cell; the at least one first slot aggregation level that is of the PUSCH in the random access procedure and that is supported by the network device includes at least one first slot aggregation level that is of the PUSCH in the random access procedure and that is supported by the network device at different area levels; and the at least one second slot aggregation level that is of the PUSCH in the random access procedure and that is supported by the network device includes at least one second slot aggregation level that is of the PUSCH in the random access procedure and that is supported by the network device at different area levels. In this way, with reference to a size of a data packet of the early data transmission and features of the two uplink carriers, a proper uplink carrier may be selected to perform the early data transmission, and a proper slot aggregation solution is selected for the proper uplink carrier, so that the early data transmission can be better implemented by using the uplink carrier and slot aggregation, and transmission of a larger amount of data of the early data transmission can be supported. For example, when the proper uplink carrier is selected, if the data packet of the early data transmission is small, slot aggregation of the PUSCH may not be used, thereby avoiding a waste of resources; if the data packet of the early data transmission is large, slot aggregation of the PUSCH is used to better implement the early data transmission of the large data packet.

According to a fifth aspect, a data transmission apparatus is provided. The apparatus has a function of implementing one of the first aspect, the second aspect, the possible designs of the first aspect, and the possible designs of the second aspect. The function may be implemented by hardware, or may be implemented by hardware executing corresponding software. The hardware or the software includes one or more modules corresponding to the foregoing function.

In a possible design, the apparatus may be a chip or an integrated circuit.

In a possible design, the apparatus includes a transceiver and a processor. The transceiver is configured to communicate with another communication device. The processor is configured to be coupled to a memory, and execute a program stored in the memory. When the program is executed, the apparatus can perform the method according to one of the first aspect, the second aspect, the possible designs of the first aspect, and the possible designs of the second aspect.

In a possible design, the apparatus further includes the memory, and the memory is configured to store the program executed by the processor.

In a possible design, the apparatus is a terminal.

According to a sixth aspect, a communication apparatus is provided. The apparatus has a function of implementing one of the third aspect, the fourth aspect, the possible designs of the third aspect, and the possible designs of the fourth aspect. The function may be implemented by hardware, or may be implemented by hardware executing corresponding software. The hardware or the software includes one or more modules corresponding to the foregoing function.

In a possible design, the apparatus may be a chip or an integrated circuit.

In a possible design, the apparatus includes a transceiver and a processor. The transceiver is configured to communicate with another communication device. The processor is configured to be coupled to a memory, and execute a program stored in the memory. When the program is executed, the apparatus can perform the method according to one of the third aspect, the fourth aspect, the possible designs of the third aspect, and the possible designs of the fourth aspect.

In a possible design, the apparatus further includes the memory, and the memory is configured to store the program executed by the processor.

In a possible design, the apparatus is a network device.

According to a seventh aspect, a data transmission apparatus is provided. The data transmission apparatus includes a communication unit and a processing unit. The communication unit is configured to receive first indication information from a network device, where the first indication information is used for early data transmission, and the first indication information includes slot aggregation information of a physical uplink shared channel PUSCH in a random access procedure. The processing unit is configured to perform early data transmission based on the first indication information. The terminal may send the PUSCH in the random access procedure based on the slot aggregation information that is of the PUSCH in the random access procedure and that is in the indication information, where the PUSCH carries uplink data of the early data transmission. In this way, a larger size of a data packet of the early data transmission is supported through slot aggregation of the PUSCH. When the data packet of the early data transmission is small, slot aggregation of the PUSCH may not be used, thereby avoiding a waste of resources. When the data packet of the early data transmission is large, slot aggregation of the PUSCH is used to better implement the early data transmission of the large data packet.

In a possible design, the processing unit is further configured to include uplink data in the random access procedure to implement the early data transmission.

In a possible design, the first indication information includes at least one of the following information: whether the network device supports slot aggregation of the PUSCH in the random access procedure, at least one slot aggregation level that is of the PUSCH in the random access procedure and that is supported by the network device, random access configuration information, and a first transport block size TBS. The TBS is used to indicate a maximum data volume of uplink data that is of the early data transmission and that is allowed to be included by the terminal at one time in the random access procedure.

In a possible design, the random access configuration information includes at least one of the following information: preamble information and/or random access channel resource information that correspond/corresponds to each of the at least one slot aggregation level, and preamble information and/or random access channel resource information that correspond/corresponds to a case in which slot aggregation is not performed for the PUSCH in the random access procedure.

In a possible design, the processing unit is further configured to select preamble information and/or random access channel resource information that are/is used for the random access procedure, where if a size of first uplink data of the early data transmission is not greater than the first TBS, the terminal selects, for the random access procedure, the preamble information and/or the random access channel resource information that correspond/corresponds to the case in which slot aggregation is not performed for the PUSCH in the random access procedure; or if a size of first uplink data of the early data transmission is greater than the first TBS, less than a product of the first TBS and a first slot aggregation level, and less than a product of the first TBS and a second slot aggregation level, the terminal selects, for the random access procedure, first preamble information and/or first random access channel resource information that correspond/corresponds to the first slot aggregation level, where the at least one slot aggregation level includes the first slot aggregation level and the second slot aggregation level, and the first slot aggregation level is less than the second slot aggregation level. In this way, when the data packet of the early data transmission is small, slot aggregation of the PUSCH may not be used, thereby avoiding a waste of resources. When the data packet of the early data transmission is large, slot aggregation of the PUSCH is used to better implement the early data transmission of the large data packet.

In a possible design, the communication unit is configured to send, to the network device on a resource selected by the processing unit for the random access procedure, the preamble information selected by the terminal for the random access procedure. In this way, the terminal can notify the network device of a corresponding slot aggregation level by using the resource and/or the preamble information in the random access procedure. Therefore, the network device can learn that normal transmission of the uplink data sent by the terminal in this time of early data transmission needs to be completed by using a proper slot aggregation level, and allocates an uplink resource for the terminal based on the slot aggregation level, to implement the early data transmission.

In a possible design, the communication unit receives random access response information from the network device, where the random access response information includes at least one of uplink data transmission grant information, timing advance information, a temporary cell radio network temporary identifier, and information used to indicate whether the early data transmission is allowed. In this way, the terminal can perform, based on information in the random access response and on the resource allocated by the network device, the early data transmission of the uplink data in a slot aggregation manner or not in the slot aggregation manner based on the slot aggregation level corresponding to the preamble and/or the random access channel resource, to implement an early data transmission procedure.

In a possible design, the communication unit sends the first uplink data of the early data transmission to the network device based on the uplink data transmission grant information. In this way, the uplink data is carried in the random access procedure, and therefore, the early data transmission procedure is implemented.

In a possible design, the first indication information further includes at least one of an area level and a parameter for performing area level classification based on signal qualities of a cell; the at least one slot aggregation level that is of the PUSCH in the random access procedure and that is supported by the network device includes at least one slot aggregation level that is of the PUSCH in the random access procedure and that is supported by the network device at different area levels, the random access configuration information includes random access configuration information at different area levels, and the first TBS includes first transport block sizes TBSs at different area levels; and the terminal determines an area level of the terminal based on a signal quality of the cell in which the terminal is located, and further determines slot aggregation information, a TBS, and random access configuration information at the area level. Through area level classification, a parameter related to slot aggregation can be determined with reference to a feature of qualities of communication between the terminal and the network device at different area levels and a feature of TBSs supported at different area levels, and therefore a proper slot aggregation level or the case in which slot aggregation is not performed is selected. In this way, early data transmission with a better transmission quality is completed.

According to an eighth aspect, a data transmission apparatus is provided. The apparatus includes a communication unit and a processing unit. The communication unit is configured to receive first indication information and second indication information from a network device, where the first indication information is used to indicate to perform early data transmission on a first uplink carrier, and the second indication information is used to indicate to perform early data transmission on a second uplink carrier. The processing unit is configured to perform early data transmission on the first uplink carrier or the second uplink carrier. The first indication information and the second indication information are used to indicate early data transmission on different uplink carriers, so that proper early data transmission solutions may be selected for the two uplink carriers. Usually, an uplink carrier with a lower frequency in the two uplink carries can be used to transmit data with a larger TBS compared with an uplink carrier with a higher frequency. In this way, a larger amount of data can be transmitted in an early data transmission process. If the uplink carrier with the high frequency cannot meet a requirement of the early data transmission, the uplink carrier with the low frequency may be selected. This helps implement the early data transmission in a communication system, and helps transmit a larger amount of data of the early data transmission.

Optionally, the first indication information and the second indication information may be carried in a same message, or may be carried in different messages.

In a possible design, the first indication information includes first random access configuration information and/or a first transport block size TBS, and the second indication information includes second random access configuration information and/or a second TBS. The terminal can determine an early data transmission manner for the first uplink carrier based on the first random access configuration information and/or the first transport block size TBS, so that the early data transmission can be better implemented. The terminal can determine an early data transmission manner for the second uplink carrier based on the second random access configuration information and/or the second transport block size TBS, so that the early data transmission can be better implemented. Therefore, the early data transmission is implemented when two uplink carriers are used for the communication system.

In a possible design, the first indication information includes at least one of the following information: whether the network device supports slot aggregation of a PUSCH in a random access procedure on the first uplink carrier, and at least one first slot aggregation level that is of the PUSCH in the random access procedure and that is supported by the network device; and the second indication information includes at least one of the following information: whether the network device supports slot aggregation of the PUSCH in a random access procedure on the second uplink carrier, and at least one second slot aggregation level that is of the PUSCH in the random access procedure and that is supported by the network device. The terminal can determine the early data transmission manner for the first uplink carrier based on content indicated by the first indication information, so that the early data transmission can be better implemented. The terminal can determine the early data transmission manner for the second uplink carrier based on content indicated by the second indication information, so that the early data transmission can be better implemented. In this way, the early data transmission can be better implemented by using the two uplink carriers and slot aggregation, and transmission of a larger amount of data of the early data transmission can be supported.

In a possible design, the first random access configuration information includes at least one of the following information: preamble information and/or random access channel resource information that correspond/corresponds to each of the at least one first slot aggregation level, and preamble information and/or random access channel resource information that correspond/corresponds to a case in which slot aggregation is not performed for the PUSCH in the random access procedure; and the second random access configuration information includes at least one of the following information: preamble information and/or random access channel resource information that correspond/corresponds to each of the at least one second slot aggregation level, and preamble information and/or random access channel resource information that correspond/corresponds to a case in which slot aggregation is not performed for the PUSCH in the random access procedure. The terminal can determine, based on the first random access configuration information, some parameters used when the early data transmission is implemented by performing random access on the first uplink carrier, so that the early data transmission can be better implemented. The terminal can determine, based on the second random access configuration information, some parameters used when the early data transmission is implemented by performing random access on the second uplink carrier, so that the early data transmission can be better implemented. Therefore, the early data transmission is implemented when two uplink carriers are used for the communication system. The first indication information and the second indication information indicate information related to slot aggregation. The terminal may send the PUSCH in the random access procedure based on slot aggregation information that is of the PUSCH in the random access procedure and that is in the first indication information or the second indication information, where the PUSCH carries uplink data of the early data transmission. In this way, a larger size of a data packet of the early data transmission is supported through slot aggregation of the PUSCH.

In a possible design, the processing unit is further configured to determine an uplink carrier for random access according to one of the following methods: if determining that a downlink reference signal quality exceeds a threshold and a size of uplink data of the early data transmission is greater than the first TBS but less than a product of the first TBS and the first slot aggregation level, selecting the first uplink carrier for random access; or if determining that a downlink reference signal quality exceeds a threshold and a size of uplink data of the early data transmission is greater than a product of the first TBS and the first slot aggregation level but less than a product of the second TBS and the second slot aggregation level, selecting the second uplink carrier for random access. In this way, with reference to a size of the data packet of the early data transmission and features of the two uplink carriers, a proper uplink carrier may be selected to perform the early data transmission, and a proper slot aggregation solution is selected for the proper uplink carrier, so that the early data transmission can be better implemented by using the uplink carrier and slot aggregation, and transmission of a larger amount of data of the early data transmission can be supported. For example, when the proper uplink carrier is selected, if the data packet of the early data transmission is small, slot aggregation of the PUSCH may not be used, thereby avoiding a waste of resources; if the data packet of the early data transmission is large, slot aggregation of the PUSCH is used to better implement the early data transmission of the large data packet.

In a possible design, the processing unit is further configured to determine an uplink carrier for random access according to one of the following methods: if determining that a downlink reference signal quality exceeds a threshold, selecting the first uplink carrier for random access; if determining that a downlink reference signal quality does not exceed a threshold, selecting the second uplink carrier for random access; if determining that a downlink reference signal quality exceeds a threshold and a size of uplink data of the early data transmission is not greater than the first TBS, selecting the first uplink carrier for random access; if determining that a downlink reference signal quality exceeds a threshold and a size of uplink data of the early data transmission is greater than the first TBS and not greater than the second TBS, selecting the second uplink carrier for random access; if determining that a size of uplink data of the early data transmission is not greater than the first TBS and not greater than the second TBS, where the second TBS is greater than the first TBS, selecting the second uplink carrier for random access; or preferentially selecting the second uplink carrier for random access. In this way, with reference to a size of the data packet of the early data transmission and features of the two uplink carriers, a proper uplink carrier may be selected to perform the early data transmission, and a proper early data transmission solution is selected for the proper uplink carrier. When the TBS supported by the uplink carrier with the higher frequency can be used for carrying the uplink data of the early data transmission, the uplink carrier with the higher frequency is selected for the data transmission. Because a spectrum of the carrier with the higher frequency is wider, the early data transmission can be performed more effectively. When the TBS supported by the uplink carrier with the higher frequency cannot be used for carrying the uplink data of the early data transmission, because the uplink carrier with the lower frequency can support a larger TBS, the uplink carrier with the lower frequency can be selected for the early data transmission. Because fading of a low-frequency signal is large, better transmission efficiency can be achieved by performing the early data transmission on an uplink carrier with a low frequency.

In a possible design, the processing unit implements the early data transmission in the random access procedure. Specifically, a process of performing the early data transmission on the first uplink carrier is: The terminal sends a random access preamble to the network device on the first uplink carrier based on the first indication information; the terminal receives a random access response from the network device; and the terminal sends the PUSCH to the network device on the first uplink carrier based on the first indication information, where the PUSCH carries the uplink data of the early data transmission. A process of performing the early data transmission on the second uplink carrier is: The terminal sends a random access preamble to the network device on the second uplink carrier based on the second indication information; the terminal receives a random access response from the network device; and the terminal sends the PUSCH to the network device on the second uplink carrier based on the second indication information, where the PUSCH carries the uplink data of the early data transmission.

The following describes possible designs of performing the early data transmission on the first uplink carrier or the second uplink carrier.

In a possible design, the communication unit is further configured to send, to the network device on a resource selected by the processing unit for the random access procedure, preamble information selected by the terminal for the random access procedure. In this way, the terminal can notify the network device of a corresponding slot aggregation level by using the resource and/or the preamble information in the random access procedure. Therefore, the network device can learn that normal transmission of the uplink data sent by the terminal in this time of early data transmission needs to be completed by using a proper slot aggregation level, and allocates an uplink resource for the terminal based on the slot aggregation level, to implement the early data transmission.

In a possible design, the communication unit is further configured to receive random access response information from the network device, where the random access response information includes at least one of uplink data transmission grant information, timing advance information, a temporary cell radio network temporary identifier, and information used to indicate whether the early data transmission is allowed. In this way, the terminal can perform, based on information in the random access response and on the resource allocated by the network device, the early data transmission of the uplink data in a slot aggregation manner or not in the slot aggregation manner based on the slot aggregation level corresponding to the preamble and/or the random access channel resource, to implement an early data transmission procedure.

In a possible design, the processing unit sends the first uplink data of the early data transmission to the network device based on the uplink data transmission grant information. The uplink data transmission grant information may include information about slot aggregation of the PUSCH. In this way, the uplink data is carried in the random access procedure, and therefore, the early data transmission procedure is implemented.

The foregoing several possible designs are applicable to early data transmission on the first uplink carrier and early data transmission on the second uplink carrier.

In a possible design, the first indication information further includes at least one of the following information for the first uplink carrier: an area level and a parameter for performing area level classification based on signal qualities of a cell; the first random access configuration information includes first random access configuration information at different area levels; and the first TBS includes first TBSs at different area levels; the second indication information further includes at least one of the following information for the second uplink carrier: an area level and a parameter for performing area level classification based on signal qualities of the cell; the second random access configuration information includes second random access configuration information at different area levels; and the second TBS includes second TBSs at different area levels; and the terminal determines an area level of the terminal based on a signal quality of the cell in which the terminal is located, and further determines a TBS and random access configuration information at the area level. Through area level classification, a proper uplink carrier can be selected for the early data transmission with reference to a feature of qualities of communication between the terminal and the network device at different area levels and a feature of TBSs supported at different area levels.

In a possible design, the first indication information further includes at least one of the following information for the first uplink carrier: an area level and a parameter for performing area level classification based on signal qualities of a cell; the second indication information further includes at least one of the following information for the second uplink carrier: an area level and a parameter for performing area level classification based on signal qualities of the cell; the at least one first slot aggregation level that is of the PUSCH in the random access procedure and that is supported by the network device includes at least one first slot aggregation level that is of the PUSCH in the random access procedure and that is supported by the network device at different area levels; the at least one second slot aggregation level that is of the PUSCH in the random access procedure and that is supported by the network device includes at least one second slot aggregation level that is of the PUSCH in the random access procedure and that is supported by the network device at different area levels; and the terminal determines an area level of the terminal based on a signal quality of the cell in which the terminal is located, and further determines slot aggregation information, a TBS, and random access configuration information at the area level. Through area level classification, a parameter related to slot aggregation can be determined with reference to a feature of qualities of communication between the terminal and the network device at different area levels and a feature of TBSs supported at different area levels, and therefore a proper slot aggregation level or the case in which slot aggregation is not performed is selected. In this way, early data transmission with a better transmission quality is completed.

According to a ninth aspect, a data transmission apparatus is provided. The apparatus includes a communication unit and a processing unit. The processing unit is configured to indicate the communication unit to receive or send data. The communication unit is configured to send first indication information to a terminal, where the first indication information is used for early data transmission, and the first indication information includes slot aggregation information of a physical uplink shared channel PUSCH in a random access procedure. The communication unit is further configured to receive uplink data sent by the terminal in the random access procedure. In this way, with the first indication information, the terminal may send the PUSCH in the random access procedure based on the slot aggregation information that is of the PUSCH in the random access procedure and that is in the first indication information, where the PUSCH carries the uplink data of early data transmission. In this way, a larger size of a data packet of the early data transmission is supported through slot aggregation of the PUSCH. When the data packet of the early data transmission is small, slot aggregation of the PUSCH may not be used, thereby avoiding a waste of resources. When the data packet of the early data transmission is large, slot aggregation of the PUSCH is used to better implement the early data transmission of the large data packet.

In a possible design, the first indication information includes at least one of the following information: whether the network device supports slot aggregation of the PUSCH in the random access procedure, at least one slot aggregation level that is of the PUSCH in the random access procedure and that is supported by the network device, random access configuration information, and a first transport block size TBS. The TBS is used to indicate a maximum data volume of uplink data that is of the early data transmission and that is allowed to be included by the terminal at one time in the random access procedure.

In a possible design, the random access configuration information includes at least one of the following information: preamble information and/or random access channel resource information that correspond/corresponds to each of the at least one slot aggregation level, and preamble information and/or random access channel resource information that correspond/corresponds to a case in which slot aggregation is not performed for the PUSCH in the random access procedure.

In a possible design, the communication unit is further configured to: receive a random access preamble from the terminal; and return a random access response to the terminal, where the random access response includes at least one of uplink data transmission grant information, timing advance information, a temporary cell radio network temporary identifier, and information used to indicate whether early data transmission is allowed. In this way, the network device can learn of a corresponding slot aggregation level by using a resource and/or preamble information in the random access procedure, can learn that normal transmission of the uplink data sent by the terminal in this time of early data transmission needs to be completed by using a proper slot aggregation level, and allocates an uplink resource for the terminal based on the slot aggregation level, to implement the early data transmission.

In a possible design, the network device determines, based on the random access preamble, at least one of the following information: the terminal needs to perform early data transmission, whether the terminal sends the PUSCH in the random access procedure in a slot aggregation manner, and a slot aggregation level used by the terminal to send the PUSCH in the random access procedure. In this way, the network device can allocate, to the terminal, an uplink resource corresponding to the random access preamble and/or a random access channel resource, to implement an early data transmission procedure.

In a possible design, the communication unit is further configured to receive the first uplink data of the early data transmission from the terminal. In this way, the uplink data is carried in the random access procedure, and therefore, the early data transmission procedure is implemented.

In a possible design, the first indication information further includes at least one of an area level and a parameter for performing area level classification based on signal qualities of a cell; and the at least one slot aggregation level that is of the PUSCH in the random access procedure and that is supported by the network device includes at least one slot aggregation level that is of the PUSCH in the random access procedure and that is supported by the network device at different area levels, the random access configuration information includes random access configuration information at different area levels, and the first TBS includes first transport block sizes TBSs at different area levels. Through area level classification, a parameter related to slot aggregation can be determined with reference to a feature of qualities of communication between the terminal and the network device at different area levels and a feature of TBSs supported at different area levels, and therefore a proper slot aggregation level or the case in which slot aggregation is not performed is selected. In this way, early data transmission with a better transmission quality is completed.

According to a tenth aspect, a data transmission apparatus is provided. The apparatus includes a communication unit and a processing unit. The processing unit is configured to indicate the communication unit to receive or send data. The communication unit is configured to send first indication information and second indication information to a terminal, where the first indication information is used to indicate to perform early data transmission on a first uplink carrier, and the second indication information is used to indicate to perform early data transmission on a second uplink carrier. The communication unit is further configured to: receive, on the first uplink carrier, uplink data sent by the terminal in a random access procedure, or receive, on the second uplink carrier, uplink data sent by the terminal in a random access procedure. The first indication information and the second indication information are used to indicate early data transmission on different uplink carriers, so that early data transmission solutions may be used for the two uplink carriers. Usually, an uplink carrier with a lower frequency in the two uplink carries can be used to transmit data with a larger TBS compared with an uplink carrier with a higher frequency. In this way, a larger amount of data can be transmitted in an early data transmission process. This helps implement early data transmission in a communication system with a high frequency, and helps transmit a larger amount of data of the early data transmission.

Optionally, the first indication information and the second indication information may be carried in a same message, or may be carried in different messages.

In a possible design, the first indication information includes first random access configuration information and/or a first transport block size TBS, and the second indication information includes second random access configuration information and/or a second TBS. In this way, an early data transmission manner for the first uplink carrier can be indicated to the terminal by using the first indication information, so that early data transmission can be better implemented. An early data transmission manner for the second uplink carrier can be indicated to the terminal by using the first indication information, so that early data transmission can be better implemented. Therefore, the early data transmission is implemented when two uplink carriers are used for a communication system.

In a possible design, the first indication information includes at least one of the following information: whether the network device supports slot aggregation of a PUSCH in the random access procedure on the first uplink carrier, and at least one first slot aggregation level that is of the PUSCH in the random access procedure and that is supported by the network device; and the second indication information includes at least one of the following information: whether the network device supports slot aggregation of the PUSCH in the random access procedure on the second uplink carrier, and at least one second slot aggregation level that is of the PUSCH in the random access procedure and that is supported by the network device. In this way, the early data transmission manner for the first uplink carrier can be indicated to the terminal by using the first indication information, so that the early data transmission can be better implemented. The early data transmission manner for the second uplink carrier can be indicated to the terminal by using the first indication information, so that the early data transmission can be better implemented. Therefore, the early data transmission is implemented when two uplink carriers are used for the communication system.

In a possible design, the first random access configuration information includes at least one of the following information: preamble information and/or random access channel resource information that correspond/corresponds to each of the at least one first slot aggregation level, and preamble information and/or random access channel resource information that correspond/corresponds to a case in which slot aggregation is not performed for the PUSCH in the random access procedure; and the second random access configuration information includes at least one of the following information: preamble information and/or random access channel resource information that correspond/corresponds to each of the at least one second slot aggregation level, and preamble information and/or random access channel resource information that correspond/corresponds to a case in which slot aggregation is not performed for the PUSCH in the random access procedure. In this way, some parameters used when the early data transmission is performed on the first uplink carrier are notified to the terminal by using the first random access configuration information, so that the early data transmission can be better implemented. Some parameters used when the early data transmission is performed on the second uplink carrier are notified to the terminal by using the second random access configuration information, so that the early data transmission can be better implemented. Therefore, the early data transmission is implemented when two uplink carriers are used for the communication system.

In a possible design, the first indication information further includes at least one of the following information for the first uplink carrier: an area level and a parameter for performing area level classification based on signal qualities of a cell; the first random access configuration information includes first random access configuration information at different area levels; and the first TBS includes first TBSs at different area levels; and the second indication information further includes at least one of the following information for the second uplink carrier: an area level and a parameter for performing area level classification based on signal qualities of the cell; the second random access configuration information includes second random access configuration information at different area levels; and the second TBS includes second TBSs at different area levels. In this way, with reference to a size of a data packet of the early data transmission and features of the two uplink carriers, a proper uplink carrier may be selected to perform the early data transmission, and a proper slot aggregation solution is selected for the proper uplink carrier, so that the early data transmission can be better implemented by using the uplink carrier and slot aggregation, and transmission of a larger amount of data of the early data transmission can be supported. For example, when the proper uplink carrier is selected, if the data packet of the early data transmission is small, slot aggregation of the PUSCH may not be used, thereby avoiding a waste of resources; if the data packet of the early data transmission is large, slot aggregation of the PUSCH is used to better implement the early data transmission of the large data packet.

In a possible design, the first indication information further includes at least one of the following information for the first uplink carrier: an area level and a parameter for performing area level classification based on signal qualities of a cell; the second indication information further includes at least one of the following information for the second uplink carrier: an area level and a parameter for performing area level classification based on signal qualities of the cell; the at least one first slot aggregation level that is of the PUSCH in the random access procedure and that is supported by the network device includes at least one first slot aggregation level that is of the PUSCH in the random access procedure and that is supported by the network device at different area levels; and the at least one second slot aggregation level that is of the PUSCH in the random access procedure and that is supported by the network device includes at least one second slot aggregation level that is of the PUSCH in the random access procedure and that is supported by the network device at different area levels. In this way, with reference to a size of a data packet of the early data transmission and features of the two uplink carriers, a proper uplink carrier may be selected to perform the early data transmission, and a proper slot aggregation solution is selected for the proper uplink carrier, so that the early data transmission can be better implemented by using the uplink carrier and slot aggregation, and transmission of a larger amount of data of the early data transmission can be supported. For example, when the proper uplink carrier is selected, if the data packet of the early data transmission is small, slot aggregation of the PUSCH may not be used, thereby avoiding a waste of resources; if the data packet of the early data transmission is large, slot aggregation of the PUSCH is used to better implement the early data transmission of the large data packet.

According to an eleventh aspect, a chip is provided. The chip is connected to a memory or the chip includes the memory, and is configured to read and execute a software program stored in the memory, to implement the method according to one of the foregoing aspects and the possible designs of the foregoing aspects.

According to a twelfth aspect, a communication system is provided. The communication system includes a terminal and a network device. The terminal is configured to perform the method according to one of the first aspect, the second aspect, the possible designs of the first aspect, and the possible designs of the second aspect, and/or the network device is configured to perform the method according to one of the third aspect, the fourth aspect, the possible designs of the third aspect, and the possible designs of the fourth aspect.

According to a thirteenth aspect, a computer storage medium is provided. The computer storage medium stores a computer program, and the computer program includes instructions used to perform the method according to one of the foregoing aspects and the possible designs of the foregoing aspects.

According to a fourteenth aspect, a computer program product including instructions is provided. When the computer program product runs on a computer, the computer is enabled to perform the method according to one of the foregoing aspects and the possible designs of the foregoing aspects.

DETAILED DESCRIPTION OF ILLUSTRATIVE EMBODIMENTS

Embodiments of this application provide a data transmission method and apparatus, to implement early data transmission in an NR communication system, so as to improve resource utilization efficiency and reduce power consumption of a terminal. The method and the apparatus are based on a same inventive concept. Because problem-resolving principles of the method and the apparatus are similar, for implementations of the apparatus and the method, refer to each other, and details of repeated parts are not described. In descriptions of the embodiments of this application, the term "and/or" describes an association relationship between associated objects and indicates that three relationships may exist. For example, A and/or B may indicate the following three cases: Only A exists, both A and B exist, and only B exists. The character "/" generally represents an "or" relationship between the associated objects. In this application, "at least one" means one or more, and "a plurality of" means two or more. In addition, it should be understood that in the descriptions of this application, terms such as "first" and "second" are merely used for distinguishing and description, but should not be understood as indicating or implying relative importance, or should not be understood as indicating or implying a sequence. X information in this application may be equivalent to X. For example, preamble information is a preamble (Preamble).

A communication method provided in the embodiments of this application may be applied to a 5th generation (5G) communication system or various future communication systems. Specifically, for example, the method may be applied to an MTC communication scenario, an NB-IoT communication scenario, or any scenario of transmitting a small data packet.

The following describes in detail the embodiments of this application with reference to the accompanying drawings.

Figure 1:
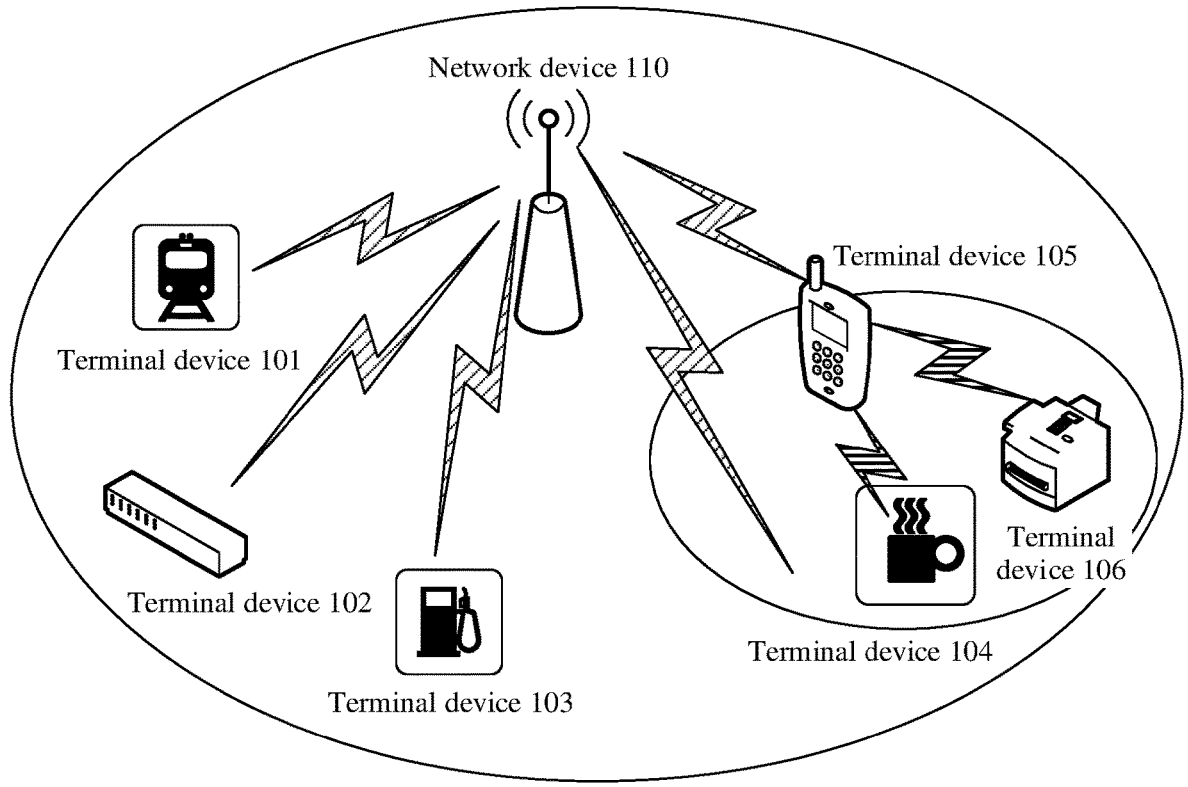
FIG. 1 is a schematic diagram of an architecture of a communication system according to an embodiment of this application.

FIG. 1 shows an architecture of a possible communication system to which the data transmission method provided in the embodiments of this application is applicable. The communication system 100 may include a network device 110 and terminal devices 101 to 106. It should be understood that the communication system 100 may include more or fewer network devices or terminal devices. The network device or the terminal device may be hardware, may be software obtained through functional division, or may be a combination thereof. In addition, terminal devices 104 to 106 may also form a communication system. For example, the terminal device 105 may send downlink data to the terminal device 104 or the terminal device 106. The network device or the terminal device may communicate with each other through another device or network element. The network device 110 may send downlink data to the terminal devices 101 to 106, and may receive uplink data sent by the terminal devices 101 to 106. Certainly, the terminal devices 101 to 106 may also send uplink data to the network device 110, and may also receive downlink data sent by the network device 110.

The network device 110 is a node in a radio access network (RAN), and may also be referred to as a base station or a RAN node (or device). Currently, for example, the access network device 101 is a gNB/an NR-NB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a wireless fidelity (Wi-Fi) access point (AP), a network side device in a 5G communication system or a possible future communication system.

The terminal devices 101 to 106 each may also be referred to as user equipment (UE), a mobile station (MS), a mobile terminal (MT), or the like, and is a device that provides a user with voice or data connectivity, or may be an internet of things device. For example, the terminal devices 101 to 106 each includes a handheld device, a vehicle-mounted device, or the like that has a wireless connection function. Currently, the terminal devices 101 to 106 each may be a mobile phone, a tablet computer, a notebook computer, a palmtop computer, a mobile internet device (MID), a wearable device (for example, a smartwatch, a smart band, or a pedometer), a vehicle-mounted device (for example, a vehicle-mounted device on an automobile, a bicycle, an electric vehicle, an aircraft, a ship, a train, or a high-speed train), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self-driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot balloon, an unmanned aerial vehicle, or an aircraft), or the like.

To facilitate understanding of the embodiments of this application, a concept of early data transmission is first described.

The early data transmission in the embodiments of this application includes uplink early data transmission and downlink early data transmission. In a process of completing uplink early data transmission, a terminal does not need to enter a connected state, and can complete transmission of uplink data in an idle state. This improves resource utilization efficiency and reduces power consumption of the terminal. In the embodiments of this application, that a terminal device transmits uplink data to a network device in a random access procedure is used as an example to describe the uplink early data transmission. The terminal can complete transmission of downlink data in the idle state, and does not need to enter the connected state. This also improves resource utilization efficiency and reduces power consumption of the terminal. In this application, the uplink early data transmission is used as an example for description of the method. It may be understood that persons skilled in the art may apply the data transmission method provided in the embodiments of this application to the downlink early data transmission.

The terminal completes uplink early data transmission in a random access procedure, and the random access procedure may have different implementations. For example, the random access procedure may include: The terminal sends a random access preamble (preamble) to a network device. The network device returns a random access response to the terminal. The terminal sends a message 3 (Msg3) to the network device, where the message 3 is a physical uplink shared channel (PUSCH), and the message 3 carries uplink data of the early data transmission. For another example, the random access procedure may alternatively include: The terminal sends a message A (MsgA) to a network device, and the network device sends a message B to the terminal. The message A includes two parts. For example, the message A includes a preamble sent by using a physical random access channel (PRACH) and a message sent by using a PUSCH. In this way, the terminal may include uplink data of the early data transmission in the message A. Similarly, the message B also includes two parts. The terminal and the network device complete the random access procedure by using two steps of message sending and receiving. In this application, related descriptions of a PUSCH in the following methods may be applied to a Msg3 or a MsgA.

Figure 2:
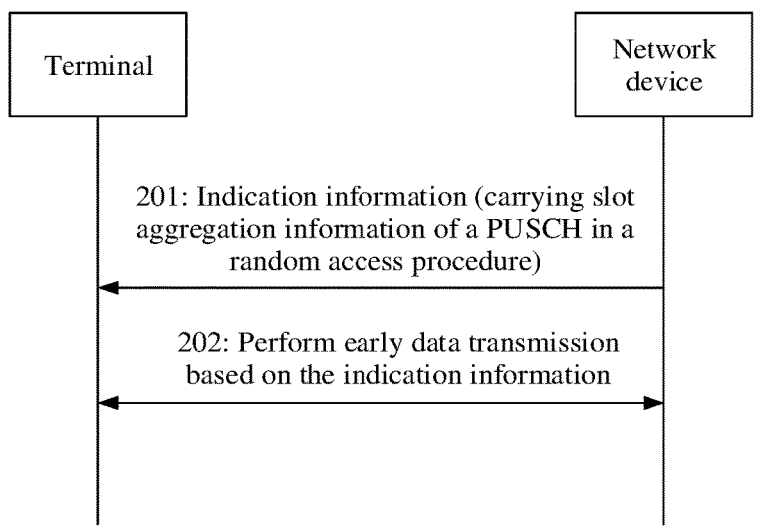
FIG. 2 is a schematic flowchart of a data transmission method according to an embodiment of this application.

Based on the foregoing descriptions, in a possible implementation, as shown in FIG. 2, a specific process of a first data transmission method provided in an embodiment of this application is described as follows.

S201: A network device sends indication information to a terminal, and the terminal receives the indication information from the network device.

The indication information is used for early data transmission, and the indication information includes slot aggregation information of a PUSCH in a random access procedure. The slot aggregation information is used to indicate the terminal to send the PUSCH in aggregated slots in the random access procedure. The indication information may include either or both of the following.

(1) Whether the network device supports slot aggregation of the PUSCH in the random access procedure. The information may be indicated by using one bit. For example, "i" indicates that the network device supports slot aggregation of the PUSCH in the random access procedure, and "o" indicates that the network device does not support slot aggregation of the PUSCH in the random access procedure. Alternatively, the bit is used for indication only when the network device supports slot aggregation of the PUSCH in the random access procedure. If the bit is not used for indication, it indicates that the network device does not support slot aggregation of the PUSCH in the random access procedure. (2) At least one slot aggregation level that is of the PUSCH in the random access procedure and that is supported by the network device: Slot aggregation means that the terminal sends the PUSCH in aggregated slots in the random access procedure. The slot aggregation level is used to indicate a quantity of the aggregated slots, and the aggregated slots are a plurality of consecutive slots. Optionally, a slot aggregation level n indicates that the PUSCH is sent on symbols with a same index in the n consecutive slots, and the slot aggregation level n may be an integer power of 2, for example, the slot aggregation level is 2, 4, 8, or the like. When the slot aggregation level is 2, it indicates that the terminal may send the PUSCH on same symbols of two slots in the random access procedure. When the indication information includes the information (2), it may implicitly indicate that the network device supports slot aggregation of the PUSCH in the random access procedure, and the information (1) may not be used for indication.

The indication information may further include: (3) random access configuration information. The random access configuration information includes at least one of random access preamble information and a random access channel resource. The random access preamble information includes information about one or more preambles that can be selected by the terminal. The random access channel resource may be, for example, a time domain resource and/or a frequency domain resource. The random access channel resource may be represented by a random access channel occasion (RO), and a random access channel resource may be determined based on a number of a RO in a RACH basic configuration. Based on the foregoing descriptions, the network device may support or not support slot aggregation of the PUSCH in the random access procedure. In this case, the random access configuration information may be further configured based on whether slot aggregation is supported and different slot aggregation levels. For example, the random access configuration information includes at least one of the following information: ① preamble information and/or random access channel resource information that correspond/corresponds to each of the at least one slot aggregation level that is of the PUSCH in the random access procedure and that is supported by the network device; and ② preamble information and/or random access channel resource information that correspond/corresponds to a case in which slot aggregation is not performed for the PUSCH in the random access procedure. The information ② is applicable to a case in which the network device supports or does not support slot aggregation of the PUSCH in the random access procedure. Table 1 shows an example of a correspondence between a slot aggregation level and information included in the random access configuration information.

TABLE 1

| Slot aggregation level of the PUSCH | Random access configuration information |
| --- | --- |
| # | Preambles 1 to 20 |
| 2 | Preamble 21 |
| 4 | Preambles 22 to 40 and RO 5 |
| 8 | Preamble 44 and RO 6 |

Table 1 shows a possible correspondence between a slot aggregation level of the PUSCH and random access configuration information. A column corresponding to the slot aggregation level includes the case in which slot aggregation is not performed, which is represented by "#". Slot aggregation levels include 2, 4, and 8. The random access configuration information includes one or two of preamble information and random access channel resource information. The preambles 1 to 20 corresponding to the case in which slot aggregation is not performed indicate that when selecting the case in which slot aggregation is not performed for the PUSCH in the random access procedure, the terminal may select a preamble from preambles with sequence numbers 1 to 20. The preamble 21 corresponding to the slot aggregation level 2 indicates that when selecting the slot aggregation level 2 of the PUSCH in the random access procedure, the terminal may select a preamble with a sequence number 21. The preambles 22 to 40 and the RO 5 that correspond to the slot aggregation level 4 indicate that when selecting the slot aggregation level 4 of the PUSCH in the random access procedure, the terminal may select a preamble from preambles with sequence numbers 22 to 40, and select a random access channel resource corresponding to the RO 5. The preamble 44 and the RO 6 that correspond to the slot aggregation level 8 indicate that when selecting the slot aggregation level 8 of the PUSCH in the random access procedure, the terminal may select a preamble with a sequence number 44, and select a random access channel resource corresponding to the RO 6.

In this application, if the indication information includes the random access preamble but does not include the random access channel resource, in the random access procedure, the terminal randomly selects a random access channel resource from random access channel resources configured on a network side, to send a preamble selected based on the indication information. If the indication information includes the random access channel resource but does not include the random access preamble information, in the random access procedure, the terminal selects any random access preamble configured on a network side for sending on a random access channel resource selected based on the indication information. If the indication information includes both the random access channel resource and the random access preamble, in the random access procedure, the terminal may send, on a random access channel resource selected based on the indication information, a preamble selected based on the indication information. This case is described in the following embodiments.

The indication information may further include: (4) transport block size (TBS). The TBS is used to indicate a maximum data volume of uplink data that is of the early data transmission and that is allowed to be included by the terminal at one time in the random access procedure.

S202: The terminal performs early data transmission based on the indication information.

As described above, that the terminal performs the early data transmission means that the terminal completes transmission of uplink data in the random access procedure. Specifically, the terminal sends the PUSCH to the network device, where the PUSCH carries the uplink data. The PUSCH may be a Msg3 in the random access procedure, and the Msg3 carries the uplink data. Alternatively, the PUSCH in a MsgA may carry the uplink data.

In a process of performing the early data transmission, the terminal first needs to select preamble information and/or random access channel resource information that are/is used for the random access procedure. The terminal may perform selection based on the indication information. For example, during selection, the terminal may compare a size of the uplink data of the early data transmission with the TBS indicated by the indication information, and select a proper preamble and/or a proper random access channel resource based on a comparison result.

If the size of the uplink data of the early data transmission is not greater than the TBS indicated by the indication information, it indicates that the terminal may complete transmission of the uplink data at one time, and does not need to perform transmission in aggregated slots. In this case, the terminal selects the information @, that is, the preamble information and/or the random access channel resource information that correspond/corresponds to the case in which slot aggregation is not performed for the PUSCH in the random access procedure.

If the size of the uplink data of the early data transmission is greater than the TBS indicated by the indication information, it indicates that the terminal cannot complete transmission of the uplink data at one time, and needs to perform transmission in aggregated slots. In this case, the terminal needs to further select a slot aggregation level. If the terminal determines that the size of the uplink data of the early data transmission is less than a product of the TBS indicated by the indication information and a specific slot aggregation level, it indicates that the terminal may complete transmission of the uplink data in aggregated slots by using the slot aggregation level. In this case, the terminal may select preamble information and/or random access channel resource information that correspond/corresponds to the slot aggregation level. Actually, in the at least one slot aggregation level that is of the PUSCH in the random access procedure and that is supported by the network device, a plurality of slot aggregation levels may meet the foregoing condition, that is, the size of the uplink data of the early data transmission is less than a product of the TBS indicated by the indication information and a specific slot aggregation level. In this case, the terminal may select preamble information and/or random access channel resource information that correspond/corresponds to any slot aggregation level that meets the condition. Alternatively, the terminal may select preamble information and/or random access channel resource information that correspond/corresponds to a small slot aggregation level in slot aggregation levels that meet the condition. For example, the size of the uplink data of the early data transmission is greater than the TBS indicated by the indication information, is less than a product of the TBS and a first slot aggregation level, and is less than a product of the TBS and a second slot aggregation level, where the first slot aggregation level is less than the second slot aggregation level. In this case, the terminal selects first preamble information and/or first random access channel resource information that correspond/corresponds to the first slot aggregation level.

In this application, the uplink data of the early data transmission may be a protocol data unit (PDU) at any protocol layer. When the size of the uplink data is compared with a size of the TBS, a data packet of the uplink data and a data packet represented by the TBS are for a same protocol layer. Optionally, the size of the uplink data of the early data transmission may include a size of a medium access control protocol data unit (MAC PDU) of a medium access control (MAC) header, or may include a size of a PDU at a radio link control (RLC) layer, or may be a size of a PDU at a packet data convergence protocol (PDCP) layer.

In the foregoing method, the terminal may select the preamble information and/or the random access channel resource information that correspond/corresponds to the case in which slot aggregation is not performed for the PUSCH in the random access procedure, or may select preamble information and/or random access channel resource information that correspond/corresponds to a specific slot aggregation level. The terminal sends a selected preamble on a selected random access channel resource. For example, the preamble may be sent in a Msg1, or the preamble may be sent on a random access channel in a MsgA. If the terminal selects the preamble information and/or the random access channel resource information that correspond/corresponds to the case in which slot aggregation is not performed for the PUSCH in the random access procedure, the terminal sends the PUSCH in one slot in the random access procedure, for example, sends the PUSCH by using a Msg3, where the PUSCH carries the uplink data. For another example, the terminal sends the PUSCH by using a MsgA, where the PUSCH carries the uplink data. If the terminal selects the preamble information and/or the random access channel resource information that correspond/corresponds to the specific slot aggregation level, the terminal sends the PUSCH in aggregated slots in the random access procedure based on the slot aggregation level. For example, when the slot aggregation level is n, the terminal may send the PUSCH on same symbols of n slots in the random access procedure.

For example, it is assumed that the TBS indicated by the indication information is 50 bits. In this case, if the size of the uplink data of the early data transmission performed by the terminal is 40 bits, the terminal selects the preamble information and/or the random access channel resource information that correspond/corresponds to the case in which slot aggregation is not performed for the PUSCH in the random access procedure, and only needs to send the PUSCH in one slot in the random access procedure. In this case, slot aggregation does not need to be performed. If the size of the uplink data of the early data transmission performed by the terminal is 60 bits, slot aggregation levels that are of the PUSCH in the random access procedure and that are supported by the network device include 2 and 4, and a product of the TBS and each of the two slot aggregation levels is greater than 60 bits, the terminal may select preamble information and/or random access channel resource information that correspond/corresponds to the smaller slot aggregation level 2, and send the PUSCH on same symbols of two slots in the random access procedure.

In this application, a manner of sending the PUSCH in the aggregated slots is not limited, and sending the PUSCH on the same symbols of the n consecutive slots is merely an example. For example, the PUSCH may alternatively be sent on symbols determined based on a specific offset in the n consecutive slots.

In this application, a slot may be equivalent to a unit time domain resource, that is, a unit time domain resource that is used to send the PUSCH in the random access procedure and that is allocated by the network device to the terminal. A slot is used as an example for description in this application. Persons skilled in the art may consider that sending the PUSCH in the aggregated slots is sending the PUSCH on aggregated unit time domain resources.

When the terminal sends the preamble by using the Msg1, after receiving the preamble sent by the terminal, the network device can determine that the terminal needs to perform early data transmission. The network device determines, based on a correspondence between a preamble and a slot aggregation level, an aggregation level requested by the terminal. The aggregation level requested by the terminal herein may include the case in which slot aggregation level is not performed. The network device sends random access response information to the terminal, and the terminal receives the random access response information from the network device. The random access response information includes at least one of uplink data transmission grant (UL grant) information, timing advance (TA) information, a temporary cell radio network temporary identifier (TC-RNTI), and information used to indicate whether this time of early data transmission is allowed. The UL grant is used to indicate a resource for sending the Msg3. In other words, the UL grant is used to indicate a resource of the PUSCH in the random access procedure. For example, if the UL grant indicates to send the PUSCH in a slot s, the terminal sends the PUSCH in the slot s. When the terminal selects a preamble corresponding to a case of slot aggregation, the terminal may alternatively send, based on a slot aggregation level, the PUSCH in the slot s and several consecutive slots after the slot s. Alternatively, the network device may indicate a plurality of slots by using the UL grant, to represent the aggregated slots. The terminal sends the uplink data of the early data transmission to the network device based on the UL grant, and the network device receives the uplink data to complete the early data transmission.

In a possible implementation, the UL grant may carry the slot aggregation information of the PUSCH in the random access procedure, for example, may carry a slot aggregation level. If the UL grant carries the slot aggregation information of the PUSCH in the random access procedure, the terminal may perform the early data transmission based on the slot aggregation information that is of the PUSCH in the random access procedure and that is carried in the UL grant. For example, if the network device indicates the slot aggregation level 2 in the UL grant, the terminal sends the PUSCH based on the slot aggregation level 2.

In conclusion, the terminal may send the PUSCH in the random access procedure based on the slot aggregation information that is of the PUSCH in the random access procedure and that is in the indication information, where the PUSCH carries the uplink data of the early data transmission. In this way, a larger size of a data packet of the early data transmission is supported through slot aggregation of the PUSCH. When the data packet of the early data transmission is small, slot aggregation of the PUSCH may not be used, thereby avoiding a waste of resources. When the data packet of the early data transmission is large, slot aggregation of the PUSCH is used to better implement the early data transmission of the large data packet.

Based on the first data transmission method provided in the foregoing embodiment, in a possible design, area level classification may be performed on locations of a cell served by the network device from the center to an edge. At different area levels, signal strengths of communication between the network device and the terminal are different. Generally, a location closer to the cell center indicates a stronger signal, and a location closer to the edge indicates larger signal fading. In this application, with reference to a solution of slot aggregation of the PUSCH in the random access procedure, different slot aggregation information is configured based on different area levels. Through slot aggregation, signal fading at the cell edge is compensated for. This helps implement effectiveness of the early data transmission, and improves reliability of the early data transmission. Detailed descriptions are provided below. Information included in the indication information in S201 may be some information related to an area level. For example, pieces of slot aggregation information that are of the PUSCH in the random access procedure and that are included in the indication information may be differentiated and indicated based on different area levels, pieces of random access configuration information included in the indication information may also be differentiated and indicated based on different area levels, and TBSs included in the indication information may also be differentiated and indicated based on different area levels. It may be understood that differentiating and indicating information based on different area levels means separately indicating information of each area level. However, specific information content at different area levels may be the same or may be different. In this case, the indication information further includes one or more area levels included in area levels, and may further include a parameter for performing area level classification based on signal qualities of the cell. The terminal may determine an area level of the terminal based on the parameter. In an implementation, the terminal may determine the area level of the terminal based on a signal measurement result, where the terminal determines a coverage enhancement level by using a signal strength threshold configured by the network device. A signal strength may be a reference signal received power (RSRP) of the cell. For example, the network device configures N RSRP thresholds, for example, RSRP 0, RSRP 1, . . . , and RSRP N−1, where RSRP 0>RSRP 1> . . . >RSRP N−1. If the terminal determines that the measurement result is RSRP N:

if RSRP N>RSRP 0, the terminal determines that the terminal is located in an area with an area level 0;
if RSRP 1<RSRP N<RSRP 0, the terminal determines that the terminal is located in an area with an area level 1;
. . . ; or
if RSRP N−1<RSRP N<RSRP N−2, the terminal determines that the terminal is located in an area with an area level N−1.

Based on this, the indication information includes at least one slot aggregation level that is of the PUSCH in the random access procedure and that is supported by the network device at different area levels. For example, area levels include A, B, and C. The network device supports, at the area level A, slot aggregation levels 2 and 4 of the PUSCH in the random access procedure, the network device supports, at the area level B, slot aggregation levels 2, 4, and 8 of the PUSCH in the random access procedure, and the network device supports, at the area level C, slot aggregation levels 4 and 8 of the PUSCH in the random access procedure.

Figure 3:
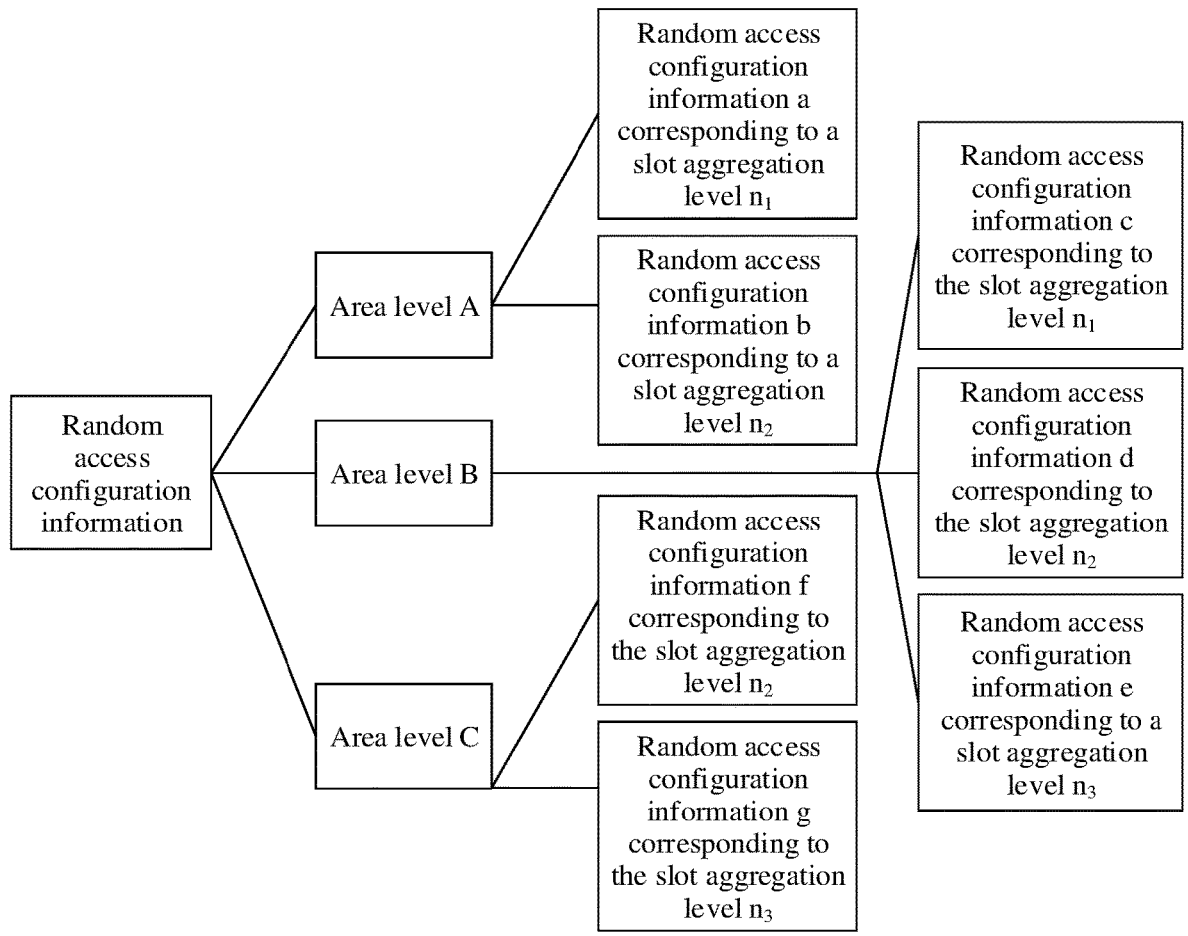
FIG. 3 is a schematic diagram of random access configuration information classification at different area levels and different slot aggregation levels according to an embodiment of this application.

The indication information includes random access configuration information at different area levels. For content of the random access configuration information, refer to specific descriptions in the foregoing embodiment. For example, the random access configuration information at different area levels includes at least one of the following information: preamble information and/or random access channel resource information that correspond/corresponds to each of the at least one slot aggregation level that is of the PUSCH in the random access procedure and that is supported by the network device at different area levels; and preamble information and/or random access channel resource information that correspond/corresponds to the case in which slot aggregation is not performed for the PUSCH in the random access procedure and that are/is at different area levels. For example, FIG. 3 is a schematic diagram of random access configuration information classification at different area levels and different slot aggregation levels. The area levels include A, B, and C. Pieces of random access configuration information are separately indicated based on different area levels. At the area level A, random access configuration information corresponding to each slot aggregation level that is of the PUSCH in the random access procedure and that is supported by the network device is indicated. For example, random access configuration information a corresponding to a slot aggregation level $n_1$ and random access configuration information b corresponding to a slot aggregation level $n_2$ are indicated. At the area level B, random access configuration information corresponding to each slot aggregation level that is of the PUSCH in the random access procedure and that is supported by the network device is indicated. For example, random access configuration information c corresponding to the slot aggregation level $n_1$, random access configuration information d corresponding to the slot aggregation level $n_2$, and random access configuration information e corresponding to a slot aggregation level $n_3$ are indicated. At the area level C, random access configuration information corresponding to each slot aggregation level that is of the PUSCH in the random access procedure and that is supported by the network device is indicated. For example, random access configuration information f corresponding to the slot aggregation level $n_2$ and random access configuration information g corresponding to the slot aggregation level $n_3$ are indicated. The random access configuration information may include random access preamble information and random access channel resource information. Pieces of random access configuration information at different aggregation levels of different area levels may have an intersection.

The indication information includes TBSs at different area levels. As described above, the TBS represents a data volume allowed for the early data transmission. TBSs are separately indicated for different area levels. For example, the area levels include A, B, and C, and a TBS at the area level A is a TBS_a, a TBS at the area level B is a TBS_b, and a TBS at the area level C is a TBS_c.

When the indication information includes the area level, in the process in which the terminal performs the early data transmission based on the indication information, the terminal needs to first determine the area level of the terminal. During actual application, the area level may be measured based on a signal quality of the cell that is measured by the terminal, and the terminal may determine the area level of the terminal based on the signal quality of the cell in which the terminal is located. For example, the terminal determines the area level of the terminal based on a reference signal received power (RSRP) of a location of the terminal. Further, the terminal determines, based on the indication information, information corresponding to the area level of the terminal, and performs the early data transmission based on the information corresponding to the area level of the terminal.

A frequency of an NR communication system is high, signal fading is large, and an uplink transmit power of a terminal is limited. Consequently, uplink coverage of a cell in the NR communication system is small. Based on this, a supplementary uplink (SUL) carrier is introduced in NR. The supplementary uplink carrier is usually an uplink carrier of long term evolution (LTE), and has a low frequency. The terminal may use an SUL carrier at an edge of the cell to improve uplink coverage. In this application, based on an inventive concept the same as that of the first data transmission method and with reference to an SUL carrier, a second data transmission method is provided.

Figure 4:
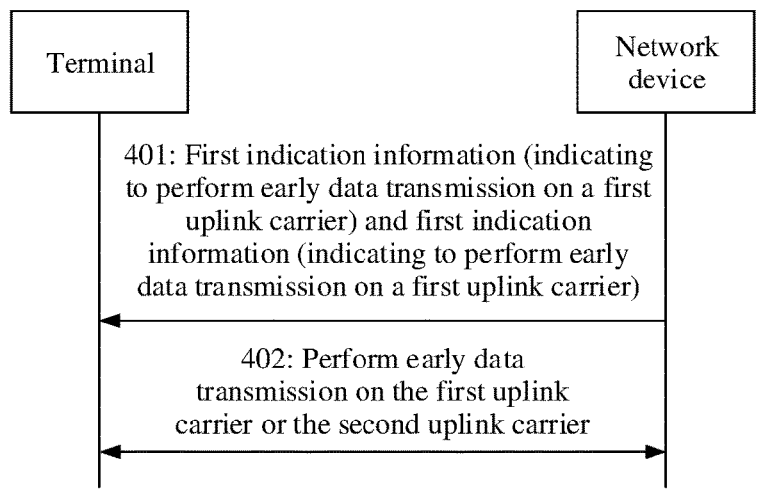
FIG. 4 is another schematic flowchart of a data transmission method according to an embodiment of this application.

As shown in FIG. 4, a specific process of the second data transmission method provided in an embodiment of this application is described as follows.

S401: A network device sends first indication information and second indication information to a terminal, and the terminal receives the first indication information and the second indication information from the network device.

The first indication information is used to indicate to perform early data transmission on a first uplink carrier, and the second indication information is used to indicate to perform early data transmission on a second uplink carrier. For example, the first uplink carrier is a carrier with a higher frequency in an NR communication system, and the second uplink carrier is an SUL carrier with a lower frequency.

It may be understood that, the first indication information and the second indication information may be carried in a same message, or may be carried in different messages.

S402: The terminal performs early data transmission on the first uplink carrier or the second uplink carrier.

In a first possible implementation, the first indication information may include at least one of first random access configuration information and a first TBS, and the second indication information may include at least one of second random access configuration information and a second TBS. The first random access configuration includes random access preamble information and random access channel resource information. Similarly, the second random access configuration includes random access preamble information and random access channel resource information.

Based on a principle the same as that of the first data transmission method, area level classification may be performed on locations of a cell served by the network device from the center to an edge. Information included in the first indication information and information included in the second indication information may be both some information related to area levels. When the first indication information includes some information related to area levels, the first indication information includes first random access configuration information at different area levels, and the first indication information may further include first TBSs at different area levels. The second indication information includes second random access configuration information at different area levels, and the second indication information may further include second TBSs at different area levels. In this case, the first indication information and the second indication information each may include one or more area levels included in area levels, and may further include a parameter for performing area level classification based on signal qualities of the cell. For descriptions of this parameter, refer to the foregoing related descriptions. Details are not described herein again.

For the first uplink carrier, the terminal may send, based on the first indication information and on a random access channel resource indicated by the first random access configuration information, a preamble indicated by the first random access configuration information, and perform the early data transmission in a random access procedure. Alternatively, for the second uplink carrier, the terminal may send, based on the second indication information and on a random access channel resource indicated by the second random access configuration information, a preamble indicated by the second random access configuration information, and perform the early data transmission in a random access procedure. In a process of performing the early data transmission on the first uplink carrier, the terminal determines, based on the first TBS, a size of uplink data of the early data transmission, and performs the early data transmission. In a process of performing the early data transmission on the second uplink carrier, the terminal determines, based on the second TBS, a size of uplink data of the early data transmission, and performs the early data transmission.

Based on a principle similar to that of the first data transmission method, the information included in the first indication information may be some information related to area levels. For example, the first indication information further includes at least one of an area level and a parameter for performing area level classification based on signal qualities of the cell. The first random access configuration information includes the first random access configuration information at different area levels, and the first TBS includes the first TBSs at different area levels. The second random access configuration information includes the second random access configuration information at different area levels, and the second TBS includes the second TBSs at different area levels. When the information related to the area levels is included, the terminal first determines an area level of the terminal, selects parameter information corresponding to the area level, and then performs the early data transmission based on the parameter information corresponding to the area level.

In the first possible implementation, the terminal may determine, in a conventional manner, whether an uplink carrier for performing the early data transmission is the first uplink carrier or the second uplink carrier. In other words, the terminal determines, in a conventional manner, whether an uplink carrier for performing random access is the first uplink carrier or the second uplink carrier. For example, the conventional manner may be: The terminal detects a downlink signal quality, compares the detected downlink signal quality with a threshold. If it is determined that the downlink signal quality exceeds the threshold, it indicates that the terminal is located at a location near the center of the cell, and the terminal selects the first uplink carrier for random access. If it is determined that the downlink signal quality does not exceed the threshold, it indicates that the terminal is located at a location at the edge of the cell, and the terminal selects the second uplink carrier for random access. In this way, the early data transmission is implemented in the random access procedure.

In a second possible implementation, for the first indication information and the second indication information, refer to related descriptions of the indication information of the first data transmission method. For example, the first indication information indicates a related parameter of the first uplink carrier, and the second indication information indicates a related parameter of the second uplink carrier. For descriptions of related parameters indicated by the first indication information and the second indication information, refer to related descriptions of the indication information, including parameter descriptions in a scenario in which area level classification is performed for the cell served by the network device and a scenario in which area level classification is not performed for the cell served by the network device.

The following describes the first indication information and the second indication information based on the descriptions of the indication information in the first data transmission method. For details not described, refer to the descriptions of the indication information in the first data transmission method.

The first indication information includes at least one of the following information: whether the network device supports slot aggregation of a PUSCH in the random access procedure on the first uplink carrier, at least one first slot aggregation level that is of the PUSCH in the random access procedure and that is supported by the network device, preamble information and/or random access channel resource information that correspond/corresponds to each of the at least one first slot aggregation level, and preamble information and/or random access channel resource information that correspond/corresponds to a case in which slot aggregation is not performed for the PUSCH in the random access procedure. When the first indication information includes some information related to area levels, the first indication information includes first random access configuration information at different area levels, may further include first TBSs at different area levels, and may further include at least one first slot aggregation level that is of the PUSCH in the random access procedure and that is supported by the network device at different area levels. In this case, the first indication information may include one or more area levels included in area levels, and may further include a parameter for performing area level classification based on signal qualities of a cell. For descriptions of this parameter, refer to the foregoing related descriptions. Details are not described herein again.

The second indication information includes at least one of the following information: whether the network device supports slot aggregation of the PUSCH in the random access procedure on the second uplink carrier, at least one second slot aggregation level that is of the PUSCH in the random access procedure and that is supported by the network device, preamble information and/or random access channel resource information that correspond/corresponds to each of the at least one second slot aggregation level, and preamble information and/or random access channel resource information that correspond/corresponds to a case in which slot aggregation is not performed for the PUSCH in the random access procedure. When the second indication information includes some information related to area levels, the second indication information includes second random access configuration information at different area levels, may further include second TBSs at different area levels, and may further include at least one second slot aggregation level that is of the PUSCH in the random access procedure and that is supported by the network device at different area levels. In this case, the second indication information may further include one or more area levels included in area levels, and may further include a parameter for performing area level classification based on signal qualities of the cell. For descriptions of this parameter, refer to the foregoing related descriptions. Details are not described herein again.

In the second possible implementation, the terminal may determine, in one of the following manners, whether an uplink carrier for performing the early data transmission is the first uplink carrier or the second uplink carrier. In other words, the terminal determines, in one of the following manners, whether an uplink carrier for performing random access is the first uplink carrier or the second uplink carrier.

Manner 1: If determining that a downlink reference signal quality exceeds a threshold, the terminal selects the first uplink carrier for random access.

Manner 2: If determining that a downlink reference signal quality does not exceed a threshold, the terminal selects the second uplink carrier for random access.

The manner 1 and the manner 2 are similar to the method for selecting an uplink carrier in the first possible implementation. If the downlink reference signal quality exceeds the threshold, it indicates that the terminal is located at a place near the center of the cell, so that the first uplink carrier with the higher frequency may be selected. If the downlink reference signal quality does not exceed the threshold, it indicates that the terminal is located at a place near an edge of the cell, so that the second uplink carrier with the lower frequency may be selected.

Manner 3: If determining that a downlink reference signal quality exceeds a threshold, and a size of uplink data of the early data transmission is greater than the first TBS but less than a product of the first TBS and a first slot aggregation level, the terminal selects the first uplink carrier for random access.

In the manner 3, whether the downlink reference signal quality exceeds the threshold may alternatively not be considered. When the size of the uplink data of the early data transmission is greater than the first TBS but less than the product of the first TBS and the first slot aggregation level, the first uplink carrier is selected for random access.

The first slot aggregation level herein is one of the at least one first slot aggregation level that is of the PUSCH in the random access procedure on the first uplink carrier and that is supported by the network device, and may be any slot aggregation level, or may be a smallest slot aggregation level that meets the foregoing size determining condition. For example, if the first slot aggregation level is a slot aggregation level a, the size of the uplink data of the early data transmission is greater than the first TBS but less than a product of the first TBS and the slot aggregation level a, the terminal selects the first uplink carrier for random access. Specifically, the terminal selects to send a preamble corresponding to the slot aggregation level a on a random access channel resource corresponding to the slot aggregation level a, and sends the PUSCH in aggregated slots based on the slot aggregation level a, to implement an early data transmission procedure on the first uplink carrier. The PUSCH carries the uplink data of the early data transmission.

Manner 4: If determining that a downlink reference signal quality exceeds a threshold and a size of uplink data of the early data transmission is greater than a product of the first TBS and a first slot aggregation level but less than a product of the second TBS and a second slot aggregation level, the terminal selects the second uplink carrier for random access.

In the manner 4, whether the downlink reference signal quality exceeds the threshold may alternatively not be considered. When the size of the uplink data of the early data transmission is greater than the product of the first TBS and the first slot aggregation level but less than the product of the second TBS and the second slot aggregation level, the second uplink carrier is selected for random access.

The first slot aggregation level herein is one of the at least one first slot aggregation level that is of the PUSCH in the random access procedure on the first uplink carrier and that is supported by the network device. It indicates that any slot aggregation level used on the first uplink carrier cannot meet the size of the uplink data of the early data transmission.

The second slot aggregation level herein is one of the at least one second slot aggregation level that is of the PUSCH in the random access procedure on the second uplink carrier and that is supported by the network device, and may be any slot aggregation level, or may be a smallest slot aggregation level that meets the foregoing size determining condition. For example, if the second slot aggregation level is a slot aggregation level b, the size of the uplink data of the early data transmission is greater than a product of the first TBS and any first slot aggregation level but less than a product of the second TBS and the slot aggregation level b, the terminal selects the second uplink carrier for random access. Specifically, the terminal selects to send a preamble corresponding to the slot aggregation level b on a random access channel resource corresponding to the slot aggregation level b, and sends the PUSCH in aggregated slots based on the slot aggregation level b, to implement an early data transmission procedure on the second uplink carrier. The PUSCH carries the uplink data of the early data transmission.

Manner 5: If determining that a downlink reference signal quality exceeds a threshold and a size of uplink data of the early data transmission is not greater than the first TBS, the terminal selects the first uplink carrier for random access.

In the manner 5, whether the downlink reference signal quality exceeds the threshold may alternatively not be considered. When the size of the uplink data of the early data transmission is not greater than the first TBS, the terminal selects the first uplink carrier for random access.

That the size of the uplink data of the early data transmission is not greater than the first TBS indicates that the uplink data of the early data transmission may be transmitted on the first uplink carrier in a manner in which slot aggregation is not performed. In this case, the first uplink carrier is selected for random access. Specifically, the terminal sends a preamble indicated by the first indication information on a random access channel resource indicated by the first indication information, and sends the PUSCH in the manner in which slot aggregation is not performed, to implement an early data transmission procedure on the first uplink carrier. The PUSCH carries the uplink data of the early data transmission.

Manner 6: If determining that a downlink reference signal quality exceeds a threshold and a size of uplink data of the early data transmission is greater than the first TBS and not greater than the second TBS, the terminal selects the second uplink carrier for random access.

In the manner 6, whether the downlink reference signal quality exceeds the threshold may alternatively not be considered. When the size of the uplink data of the early data transmission is greater than the first TBS and not greater than the second TBS, the terminal selects the second uplink carrier for random access.

That the size of the uplink data of the early data transmission is not greater than the second TBS indicates that the uplink data of the early data transmission may be transmitted on the second uplink carrier in a manner in which slot aggregation is not performed. In this case, the second uplink carrier is selected for random access. Specifically, the terminal sends a preamble indicated by the second indication information on a random access channel resource indicated by the second indication information, and sends the PUSCH in the manner in which slot aggregation is not performed, to implement an early data transmission procedure on the second uplink carrier. The PUSCH carries the uplink data of the early data transmission.

Manner 7: If determining that a size of uplink data of the early data transmission is not greater than the first TBS and not greater than the second TBS, where the second TBS is greater than the first TBS, the terminal selects the second uplink carrier for random access.

On the contrary, if determining that the size of the uplink data of the early data transmission is not greater than the first TBS and not greater than the second TBS, where the first TBS is greater than the second TBS, the terminal selects the first uplink carrier for random access.

In conclusion, an uplink carrier with a larger TBS is preferentially selected for random access.

That the second TBS is greater than the first TBS is used as an example. That the size of the uplink data of the early data transmission is not greater than the first TBS and not greater than the second TBS indicates that the uplink data of the early data transmission may be transmitted on either the first uplink carrier or the second uplink carrier in a manner in which slot aggregation is not performed. In this case, the second uplink carrier with a larger TBS is preferentially selected for random access. Specifically, the terminal sends a preamble indicated by the second indication information on a random access channel resource indicated by the second indication information, and sends the PUSCH in the manner in which slot aggregation is not performed, to implement an early data transmission procedure on the second uplink carrier. The PUSCH carries the uplink data of the early data transmission.

Manner 8: The second uplink carrier is preferentially selected for random access.

Because fading of a low-frequency signal is large, better transmission efficiency can be achieved by performing the early data transmission on an uplink carrier with a low frequency.

On the contrary, the first uplink carrier may alternatively be preferentially selected for random access. In conclusion, uplink carrier selection is performed based on priority information specified in a protocol.

For example, the second uplink carrier is preferentially selected for random access, and the terminal sends a preamble indicated by the second indication information on a random access channel resource indicated by the second indication information, and sends the PUSCH in a manner in which slot aggregation is not performed, to implement an early data transmission procedure on the second uplink carrier. The PUSCH carries uplink data of the early data transmission.

In the second data transmission method, if the terminal chooses to perform the early data transmission on the first uplink carrier, the terminal performs the early data transmission based on the first indication information; if the terminal chooses to perform the early data transmission on the second uplink carrier, the terminal performs the early data transmission based on the second indication information. For a manner in which the terminal performs the early data transmission based on the first indication information and a manner in which the terminal performs the early data transmission based on the second indication information, refer to the method in which the terminal performs the early data transmission based on the indication information in S202 in the first data transmission method. The following describes basic steps. For descriptions of some details, refer to the descriptions of the method in which the terminal performs the early data transmission based on the indication information in S202 in the first data transmission method.

That the terminal performs the early data transmission on the first uplink carrier based on the first indication information is specifically: The terminal sends a random access preamble to the network device on the first uplink carrier based on the first indication information. The network device receives the random access preamble, and returns a random access response to the terminal. The terminal receives the random access response from the network device. The terminal sends the PUSCH to the network device on the first uplink carrier based on the first indication information, where the PUSCH carries uplink data of the early data transmission. The terminal chooses, based on a size of the uplink data of the early data transmission and slot aggregation information indicated by the first indication information, to send the PUSCH in a manner in which slot aggregation is not performed, or chooses to send the PUSCH in aggregated slots in a manner corresponding to a slot aggregation level.

That the terminal performs the early data transmission on the second uplink carrier based on the second indication information is specifically: The terminal sends a random access preamble to the network device on the second uplink carrier based on the second indication information. The network device receives the random access preamble, and returns a random access response to the terminal. The terminal receives the random access response from the network device. The terminal sends the PUSCH to the network device on the second uplink carrier based on the second indication information, where the PUSCH carries uplink data of the early data transmission. The terminal chooses, based on a size of the uplink data of the early data transmission and slot aggregation information indicated by the second indication information, to send the PUSCH in a manner in which slot aggregation is not performed, or chooses to send the PUSCH in aggregated slots in a manner corresponding to a slot aggregation level.

In conclusion, in the second data transmission method provided in the embodiments of this application, the first indication information and the second indication information are used to indicate early data transmission on different uplink carriers, so that early data transmission solutions may be applied on the two uplink carriers. Usually, an uplink carrier with a lower frequency in the two uplink carries can be used to transmit data with a larger TBS compared with an uplink carrier with a higher frequency. In this way, a larger amount of data can be transmitted in an early data transmission process. This helps implement the early data transmission in a communication system with a high frequency, and helps transmit a larger amount of data of the early data transmission. When the first indication information and the second indication information indicate information related to slot aggregation, the terminal may send the PUSCH in the random access procedure based on the slot aggregation information that is of the PUSCH in the random access procedure and that is in the first indication information or the second indication information, where the PUSCH carries the uplink data of the early data transmission. In this way, a larger size of a data packet of the early data transmission is supported through slot aggregation of the PUSCH. When the data packet of the early data transmission is small, slot aggregation of the PUSCH may not be used, thereby avoiding a waste of resources. When the data packet of the early data transmission is large, slot aggregation of the PUSCH is used to better implement the early data transmission of the large data packet.

Based on the descriptions of the first data transmission method and the second data transmission method, an example in which early data transmission is performed by including uplink data in a message 3 is used below to describe an early data transmission procedure.

Figure 5:
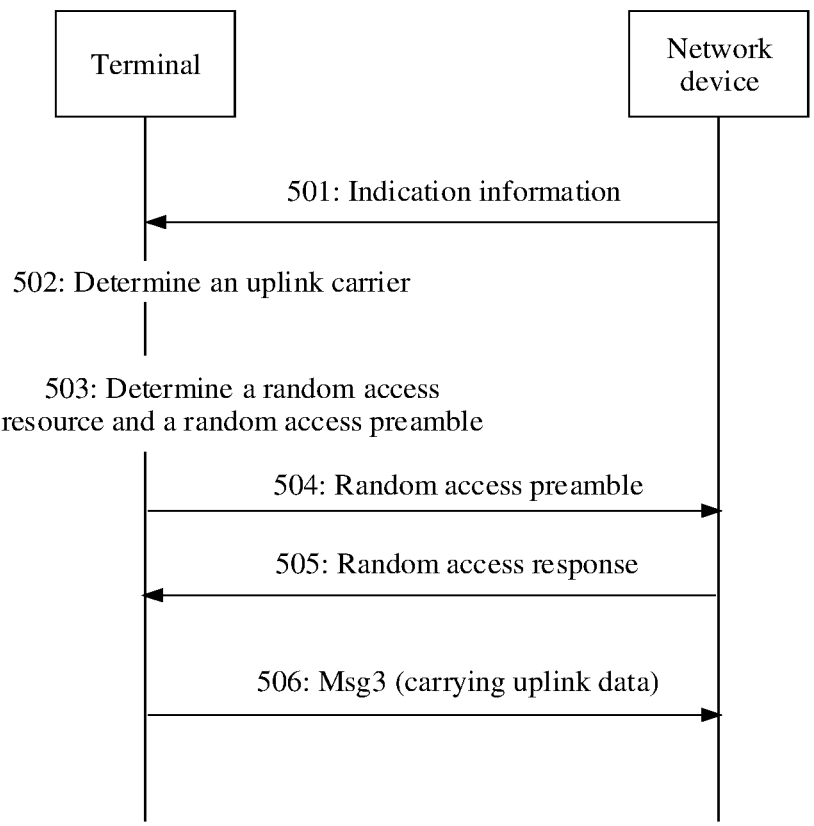
FIG. 5 is a schematic flowchart of an early data transmission method according to an embodiment of this application.

As shown in FIG. 5, an early data transmission procedure is as follows:

S501: A network device sends indication information to a terminal, and the terminal receives the indication information from the network device.

The indication information may be the indication information in S201. If a communication system supports two uplink carriers, for example, a normal UL carrier and an SUL carrier, the indication information may include the first indication information and the second indication information in S401.

The terminal obtains some information related to early data transmission based on the indication information.

S502: The terminal determines an uplink carrier.

If the indication information indicates two uplink carriers, the terminal selects a first uplink carrier or a second uplink carrier in the manner provided in the second data transmission method. If the indication information does not indicate two uplink carriers, the terminal can perform data transmission on only one uplink carrier. Usually, the terminal performs data transmission on a normal UL carrier.

S503: The terminal determines a random access channel resource and a random access preamble.

If the indication information indicates two uplink carriers, when the first uplink carrier is selected, the terminal determines the random access channel resource and/or the random access preamble based on the first indication information; when the second uplink carrier is selected, the terminal determines the random access channel resource and/or the random access preamble based on the second indication information. If the indication information does not indicate two uplink carriers, the terminal determines the random access channel resource and/or the random access preamble based on the indication information in S201.

The indication information described below may be the indication information described in S201, or may be the first indication information or the second indication information.

If the indication information indicates that the network device does not support slot aggregation of a PUSCH in a random access procedure, the terminal randomly selects a preamble based on the random access configuration information configured on a network side, and performs random access on any random access channel resource configured on the network side.

If the indication information indicates that the network device supports slot aggregation of the PUSCH in the random access procedure, or the indication information indicates at least one slot aggregation level that is of the PUSCH in the random access procedure and that is supported by the network device, the terminal first selects a proper slot aggregation level based on a TBS indicated by the indication information and a size of uplink data of this time of transmission, and further selects a random access channel resource and/or a random access preamble that correspond/corresponds to the proper slot aggregation level. One or two of the random access channel resource and the random access preamble may be selected. If the random access channel resource corresponding to the slot aggregation level is selected, a preamble is randomly selected from random access preambles configured on the network side. If the random access preamble is selected, a random access channel resource is randomly selected from random access channel resources configured on the network side.

For a specific method for selecting the proper slot aggregation level, refer to related descriptions in the first data transmission method and the second data transmission method. Details are not described again.

S504: The terminal sends the determined random access preamble on the determined random access channel resource, and the network device receives the random access preamble from the terminal.

If the terminal selects the random access preamble matching the slot aggregation level, after receiving the random access preamble, the network device determines that the terminal needs to perform early data transmission, and may determine, based on the random access preamble, the slot aggregation level requested by the terminal. Similarly, if the terminal selects the random access channel resource matching the slot aggregation level, after receiving the random access preamble, the network device determines that the terminal needs to perform early data transmission, and may determine, based on the random access channel resource, the slot aggregation level requested by the terminal.

S505: The network device returns a random access response (RAR) to the terminal, and the terminal receives the random access response from the network device.

The random access response includes a UL grant used for uplink data transmission of the terminal. The UL grant is used to indicate a resource location for sending a Msg3 by the terminal, and may further indicate a quantity of repetitions for sending the Msg3 by the terminal.

S506: The terminal sends the Msg3 to the network device, and the network device receives the Msg3 from the terminal.

The uplink data is carried in the Msg3, and therefore, the early data transmission is implemented. When sending the Msg3, the terminal needs to send the Msg3 based on the indication information and/or the selected slot aggregation level.

If the terminal determines not to send the Msg3 in a slot aggregation manner, the terminal only needs to send the Msg3 at the resource location indicated by the UL grant. The terminal may send the Msg3 at a slot location indicated by the UL grant.

If the terminal sends the Msg3 in the slot aggregation manner, the terminal needs to send the Msg3 based on the selected slot aggregation level. The terminal sends the Msg3 in a plurality of slots based on the slot aggregation level and the resource location indicated by the UL grant. If the UL grant indicates one slot location, the terminal sends the Msg3 in a plurality of consecutive slots starting from the slot location, and a quantity of times for sending the Msg3 is determined based on the slot aggregation level. Alternatively, the network device may indicate a plurality of slot locations in the UL grant based on the slot aggregation level selected by the terminal, and the terminal only needs to send the Msg3 at the plurality of slot locations based on the slot aggregation level.

If the UL grant indicates the quantity of repetitions for sending the Msg3 by the terminal, the terminal sends the Msg3 based on the quantity of repetitions indicated by the UL grant. The quantity of repetitions corresponds to the slot aggregation level. In other words, when the slot aggregation level has been selected, if the terminal receives the quantity of repetitions indicated by the network device, the terminal sends the Msg3 based on the quantity of repetitions indicated by the network device.

Figure 6:
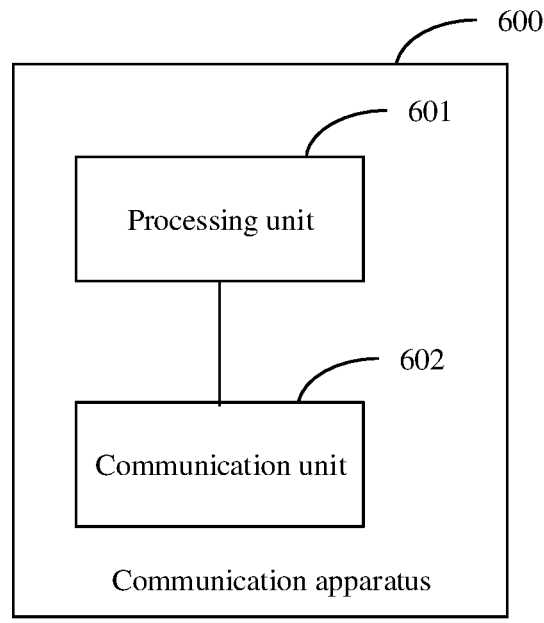
FIG. 6 is a first schematic diagram of a structure of a data transmission apparatus according to an embodiment of this application.

Based on a concept the same as that of the foregoing method embodiments, as shown in FIG. 6, an embodiment of this application further provides a data transmission apparatus 600. The data transmission apparatus 600 has a function of performing the operations performed by the terminal or the network device in the foregoing method embodiments. The function may be implemented by hardware, or may be implemented by hardware executing corresponding software. The hardware or the software includes one or more modules corresponding to the foregoing function. For example, the data transmission apparatus 600 includes a processing unit 601 and a communication unit 602. The communication unit 602 is configured to perform sending and/or receiving steps in the method embodiments. The processing unit 601 is configured to perform another step other than the sending and/or receiving steps. Further, the communication unit 602 may include a sending unit and/or a receiving unit. The communication apparatus 600 may be a terminal, or may be a chip or a function module inside the terminal.

In a case in which the communication apparatus 600 is configured to perform the operations performed by the terminal in the first data transmission method:

The communication unit 602 is configured to receive indication information from a network device, where the indication information is used for early data transmission, and the indication information includes slot aggregation information of a physical uplink shared channel PUSCH in a random access procedure.

The processing unit 601 is configured to perform early data transmission based on the indication information.

For a concept and an explanation of the indication information, refer to the descriptions of the indication information in the first data transmission method.

Optionally, the processing unit 601 is further configured to select preamble information and/or random access channel resource information that are/is used for the random access procedure. Specifically, if a size of first uplink data of the early data transmission is not greater than a first TBS, the processing unit 601 selects, for the random access procedure, preamble information and/or random access channel resource information that correspond/corresponds to a case in which slot aggregation is not performed for the PUSCH in the random access procedure; or if a size of first uplink data of the early data transmission is greater than a first TBS, less than a product of the first TBS and a first slot aggregation level, and less than a product of the first TBS and a second slot aggregation level, the processing unit 601 selects, for the random access procedure, first preamble information and/or first random access channel resource information that correspond/corresponds to the first slot aggregation level, where at least one slot aggregation level includes the first slot aggregation level and the second slot aggregation level, and the first slot aggregation level is less than the second slot aggregation level.

The selection method is merely an example, and the processing unit 601 may select any slot aggregation level at which the uplink data of the early data transmission can be carried.

Optionally, the communication unit 602 is further configured to send and receive some information in the random access procedure. An example is as follows.

The communication unit 602 is configured to send, to the network device on a resource selected by the processing unit 601 for the random access procedure, the preamble information selected by the processing unit 601 for the random access procedure.

The communication unit 602 is further configured to receive random access response information from the network device, where the random access response information includes at least one of uplink data transmission grant information, timing advance information, a temporary cell radio network temporary identifier, and information used to indicate whether the early data transmission is allowed.

The communication unit 602 is further configured to send the first uplink data of the early data transmission to the network device based on the uplink data transmission grant information.

In a case in which the communication apparatus 600 is configured to perform the operations performed by the terminal in the second data transmission method.

The communication unit 602 is configured to receive first indication information and second indication information from a network device, where the first indication information is used to indicate to perform early data transmission on a first uplink carrier, and the second indication information is used to indicate to perform early data transmission on a second uplink carrier.

The processing unit 601 is configured to perform early data transmission on the first uplink carrier or the second uplink carrier.

For a concept and an explanation of the first indication information and the second indication information, refer to the descriptions of the first indication information and the second indication information in the second data transmission method.

Optionally, the processing unit 601 is further configured to determine an uplink carrier for random access according to one of the following methods: if determining that a downlink reference signal quality exceeds a threshold and a size of uplink data of the early data transmission is greater than a first TBS but less than a product of the first TBS and a first slot aggregation level, selecting the first uplink carrier for random access; or if determining that a downlink reference signal quality exceeds a threshold and a size of uplink data of the early data transmission is greater than a product of a first TBS and a first slot aggregation level but less than a product of a second TBS and a second slot aggregation level, selecting the second uplink carrier for random access.

The processing unit 601 may alternatively determine an uplink carrier for random access according to one of the following methods:

if determining that a downlink reference signal quality exceeds a threshold, selecting the first uplink carrier for random access;

if determining that a downlink reference signal quality does not exceed a threshold, selecting the second uplink carrier for random access;

if determining that a downlink reference signal quality exceeds a threshold and a size of uplink data of the early data transmission is not greater than a first TBS, selecting the first uplink carrier for random access;

if determining that a downlink reference signal quality exceeds a threshold and a size of uplink data of the early data transmission is greater than a first TBS and not greater than a second TBS, selecting the second uplink carrier for random access;

if determining that a size of uplink data of the early data transmission is not greater than a first TBS and not greater than a second TBS, where the second TBS is greater than the first TBS, selecting the second uplink carrier for random access; or preferentially selecting the second uplink carrier for random access.

Optionally, the communication unit 602 is further configured to send and receive some information in a random access procedure on the first uplink carrier. An example is as follows:

The communication unit 602 is configured to: send a random access preamble to the network device on the first uplink carrier based on the first indication information; receive a random access response from the network device; and send a PUSCH to the network device on the first uplink carrier based on the first indication information, where the PUSCH carries the uplink data of the early data transmission.

Alternatively, the communication unit 602 is further configured to send and receive some information in a random access procedure on the second uplink carrier. An example is as follows:

The communication unit 602 is configured to: send a random access preamble to the network device on the second uplink carrier based on the second indication information; receive a random access response from the network device; and send a PUSCH to the network device on the second uplink carrier based on the second indication information, where the PUSCH carries the uplink data of the early data transmission.

The communication apparatus 600 may be a network device, or may be a chip or a function module inside the network device.

In a case in which the communication apparatus 600 is configured to perform the operations performed by the network device in the first data transmission method:

The communication unit 602 is configured to: send indication information to a terminal, where the indication information is used for early data transmission, and the indication information includes slot aggregation information of a physical uplink shared channel PUSCH in a random access procedure; and receive uplink data sent by the terminal in the random access procedure.

For a concept and an explanation of the indication information, refer to the descriptions of the indication information in the first data transmission method.

Optionally, the communication unit 602 is further configured to: receive a random access preamble from the terminal; and return a random access response to the terminal, where the random access response includes at least one of uplink data transmission grant information, timing advance information, a temporary cell radio network temporary identifier, and information used to indicate whether the early data transmission is allowed.

Optionally, the processing unit 601 is further configured to determine, based on the random access preamble, at least one of the following information: the terminal needs to perform early data transmission, whether the terminal sends the PUSCH in the random access procedure in a slot aggregation manner, and a slot aggregation level used by the terminal to send the PUSCH in the random access procedure.

In a case in which the communication apparatus 600 is configured to perform the operations performed by the network device in the second data transmission method:

The communication unit 602 is configured to: send first indication information and second indication information to a terminal, where the first indication information is used to indicate to perform early data transmission on a first uplink carrier, and the second indication information is used to indicate to perform early data transmission on a second uplink carrier; and receive, on the first uplink carrier, uplink data sent by the terminal in a random access procedure, or receive, on the second uplink carrier, uplink data sent by the terminal in a random access procedure.

For a concept and an explanation of the first indication information and the first indication information, refer to the descriptions of the first indication information and the second indication information in the second data transmission method.

It may be understood that the processing unit 601 and the communication unit 602 may further perform other corresponding operations in the foregoing method embodiments. Details are not described herein again.

Figure 7:
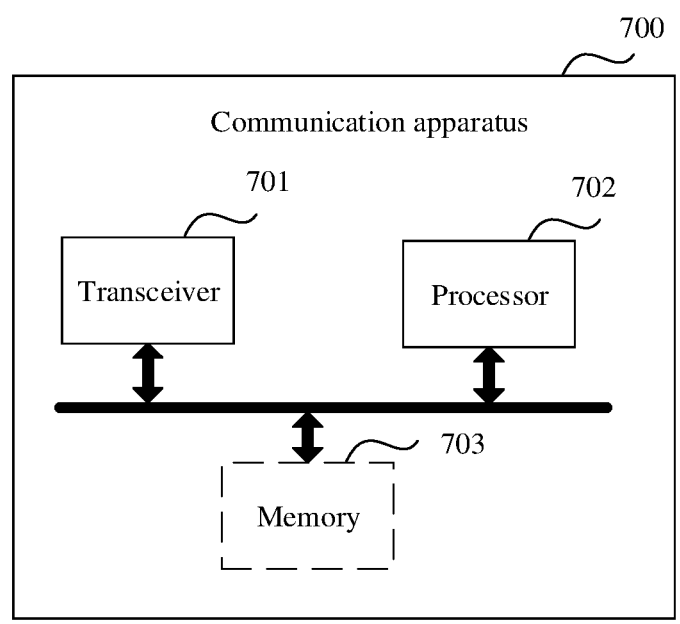
FIG. 7 is a second schematic diagram of a structure of a data transmission apparatus according to an embodiment of this application.

Based on a concept the same as that of the foregoing method embodiments, as shown in FIG. 7, an embodiment of this application further provides a data transmission apparatus 700. The data transmission apparatus 700 is configured to implement operations performed by the terminal and/or the network device in the foregoing method embodiments. FIG. 7 shows only main components of the communication apparatus 700.

The communication apparatus 700 includes a transceiver 701, a processor 702, and a memory 703. The memory 703 is optional. The transceiver 701 is configured to transmit a message or signaling with another communication device. The processor 702 is coupled to the memory 703, and is configured to invoke a program in the memory 703. When the program is executed, the processor 702 is enabled to perform the operations performed by the terminal and/or the network device in the foregoing method embodiments. The memory 703 is configured to store the program executed by the processor 702. The transceiver 701 may include a transmitter and/or a receiver, to respectively implement a sending function and a receiving function. There may be one or more processors 702. The memory 703 may be located in the processor 702, or may exist independently. In the function modules in FIG. 6, the processing unit 601 may be implemented by using the processor 702, and the communication unit 602 may be implemented by using the transceiver 701. Persons skilled in the art may understand that, for ease of description, FIG. 7 shows only one memory and one processor. An actual terminal and/or an actual network device each may include a plurality of processors and a plurality of memories. The memory may also be referred to as a storage medium, a storage device, or the like. This is not limited in the embodiments of this application.

The processor 702 is mainly configured to: process a communication protocol and communication data, control the entire terminal and/or the entire network device, execute a software program, and process data of the software program. For example, the processor 702 is configured to support the terminal and/or the network device in performing actions described in the foregoing method embodiments. The memory 703 is mainly configured to store the software program and data.

When performing a function of the terminal, for example, the processor 702 performs the following operations: receiving indication information from the network device, and performing early data transmission based on the indication information. Alternatively, the processor 702 performs the following operations: receiving first indication information and second indication information from the network device, and performing early data transmission on a first uplink carrier or a second uplink carrier. The first indication information is used to indicate to perform the early data transmission on the first uplink carrier, and the second indication information is used to indicate to perform the early data transmission on the second uplink carrier.

When performing a function of the network device, for example, the processor 702 performs the following operations: sending indication information to the terminal, where the indication information is used for early data transmission, and the first indication information includes slot aggregation information of a physical uplink shared channel PUSCH in a random access procedure; and receiving uplink data sent by the terminal in the random access procedure.

Alternatively, the processor 702 performs the following operations: sending first indication information and second indication information to the terminal, and receiving, on a first uplink carrier, uplink data sent by the terminal in a random access procedure, or receiving, on a second uplink carrier, uplink data sent by the terminal in a random access procedure. The first indication information is used to indicate to perform early data transmission on the first uplink carrier, and the second indication information is used to indicate to perform early data transmission on the second uplink carrier.

The processor 702 may further perform another operation or function performed by the terminal or the network device in the foregoing method embodiments. Repeated parts are not described again.

When the function of the network device is performed, a form of the communication apparatus 700 may be described as follows. The communication apparatus 700 is a base station, and the base station may include one or more radio frequency units, such as a remote radio unit (RRU) and one or more baseband units (BBU) (which may also be referred to as digital units (DUs)). The RRU may be referred to as a transceiver unit, a transceiver machine, a transceiver circuit, a transceiver, or the like, and may include at least one antenna and a radio frequency unit. The part RRU is mainly configured to send or receive a radio frequency signal and perform conversion between the radio frequency signal and a baseband signal. The part BBU is mainly configured to perform baseband processing, control the base station, and so on. The RRU and the BBU may be physically disposed together, or may be physically disposed separately, that is, a distributed base station.

The BBU is a control center of the base station, may also be referred to as a processing unit, and is mainly configured to implement a baseband processing function, for example, channel coding, multiplexing, modulation, and spectrum spreading. For example, the BBU (processing unit) may be configured to control the base station to perform an operation procedure related to the network device in the foregoing method embodiments.

In an embodiment, the BBU may include one or more boards. A plurality of boards may jointly support a radio access network (such as an LTE network) of a single access standard, or may separately support radio access networks (such as an LTE network, a 5G network, and another network) of different access standards. The BBU further includes the memory 703 and the processor 702. The memory 703 is configured to store instructions and data that are necessary. The processor 702 is configured to control the base station to perform a necessary action, for example, is configured to control the base station to perform an operation procedure related to the network device in the foregoing method embodiments. The memory and the processor may serve the one or more boards. In other words, a memory and a processor may be independently disposed on each board. Alternatively, a plurality of boards may share a same memory and a same processor. In addition, a necessary circuit may be further disposed on each board.

The processor 702 may be a central processing unit (CPU), a network processor (NP), or a combination of a CPU and an NP.

The processor 702 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 703 may include a volatile memory, such as a random-access memory (RAM). Alternatively, the memory 703 may include a non-volatile memory, such as a flash memory, a hard disk drive (HDD), or a solid-state drive (SSD). Alternatively, the memory 703 may include a combination of the foregoing types of memories.

In addition, when the function of the network device is performed, the communication apparatus 700 is not limited to the foregoing forms, and may also be in another form. For example, the communication apparatus 700 includes a BBU and an adaptive radio unit (ARU), or includes a BBU and an active antenna unit (AAU), or may be customer premises equipment (CPE), or may be in another form. This is not limited in this application.

Some or all of the operations and functions that are performed by the terminal and that are described in the foregoing method embodiments of this application, or some or all of the operations and functions that are performed by the network device and that are described in the foregoing method embodiments of this application may be completed by using a chip or an integrated circuit.

To implement the functions of the data transmission apparatus in FIG. 6 or FIG. 7, an embodiment of this application further provides a chip, including a processor, and configured to support the data transmission apparatus in implementing the functions related to the terminal or the network device in the foregoing method embodiments. In a possible design, the chip is connected to a memory or the chip includes a memory, and the memory is configured to store program instructions and data that are necessary for the communication apparatus.

An embodiment of this application provides a computer storage medium that stores a computer program. The computer program includes instructions used to perform the foregoing method embodiments.

An embodiment of this application provides a computer program product including instructions. When the computer program product runs on a computer, the computer is enabled to perform the foregoing method embodiments.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Clearly, persons skilled in the art can make various modifications and variations to the embodiments of this application without departing from the spirit and scope of the embodiments of this application. In this way, this application is intended to cover these modifications and variations of the embodiments of this application provided that they fall within the scope of protection defined by the following claims and their equivalent technologies.

What is claimed is:

1. A method, comprising:
  receiving, by a terminal, first indication information from a network device, wherein the first indication information comprises slot aggregation information of a physical uplink shared channel (PUSCH) to use in a random access procedure for early data transmission;
  selecting, by the terminal according to the slot aggregation information of the PUSCH to use in the random access procedure for early data transmission and a size of first uplink data to send in the early data transmission, preamble information for the random access procedure or resource information for the random access procedure, wherein selecting, by the terminal according to the slot aggregation information of the PUSCH to use in the random access procedure for the early data transmission and the size of the first uplink data to send in the early data transmission, the preamble information for the random access procedure or the resource information for the random access procedure comprises:
    when the size of the first uplink data to send in the early data transmission is not greater than a first transport block size (TBS), selecting, for the random access procedure, preamble information corresponding to slot aggregation not being performed for the PUSCH in the random access procedure or random access channel resource information corresponding to slot aggregation not being performed for the PUSCH in the random access procedure; or
    when the size of the first uplink data to send in the early data transmission is greater than the first TBS, less than a product of the first TBS and a first slot aggregation level, and less than a product of the first TBS and a second slot aggregation level, selecting, for the random access procedure, first preamble information corresponding to the first slot aggregation level or first random access channel resource information corresponding to the first slot aggregation level, wherein the first slot aggregation level is less than the second slot aggregation level; and performing, by the terminal, early data transmission based on the first indication information.

2. The method according to claim 1, wherein the first indication information comprises at least one of the following information:

whether the network device supports slot aggregation of the PUSCH in the random access procedure, the first slot aggregation level of the PUSCH in the random access procedure or the second slot aggregation level of the PUSCH in the random access procedure that are supported by the network device, random access configuration information, or the first transport block size (TBS).

3. The method according to claim 2, wherein the random access configuration information comprises at least one of the following information:

preamble information that corresponds to the first slot aggregation level and the second slot aggregation level, random access channel resource information that corresponds to the first slot aggregation level and the second slot aggregation level, the preamble information corresponding to slot aggregation not being performed for the PUSCH in the random access procedure, or the random access channel resource information corresponding to slot aggregation not being performed for the PUSCH in the random access procedure.

4. The method according to claim 1, further comprising:

sending, by the terminal to the network device on a resource selected by the terminal for the random access procedure, the preamble information selected by the terminal for the random access procedure.

5. A method, comprising:

sending, by a network device, first indication information to a terminal, wherein the first indication information comprises slot aggregation information of a physical uplink shared channel (PUSCH) to use in a random access procedure for an early data transmission; and receiving, by the network device, first uplink data sent by the terminal in the random access procedure in the early data transmission, wherein slot aggregation of the PUSCH is used for the random access procedure, and wherein a slot aggregation level used for the early data transmission corresponds to preamble information used in the random access procedure, or the slot aggregation level used for the early data transmission corresponds to a resource used in the random access procedure, and wherein the slot aggregation level used for the early data transmission corresponding to the preamble information used in the random access procedure, or the slot aggregation level used for the early data transmission corresponding to the resource used in the random access procedure, comprises:

when a size of the first uplink data is not greater than a first transport block size (TBS), the preamble information used in the random access procedure corresponds to slot aggregation not being performed for the PUSCH in the random access procedure, or a random access channel resource used in the random access procedure corresponds to slot aggregation not being performed for the PUSCH in the random access procedure; or when the size of the first uplink data is greater than the first TBS, less than a product of the first TBS and a first slot aggregation level, and less than a product of the first TBS and a second slot aggregation level, first preamble information corresponding to the first slot aggregation level is used in the random access procedure, or a first random access channel resource corresponding to the first slot aggregation level is used in the random access procedure, and wherein the first slot aggregation level is less than the second slot aggregation level.

6. The method according to claim 5, wherein the first indication information comprises at least one of the following information:

whether the network device supports slot aggregation of the PUSCH in the random access procedure, the first slot aggregation level of the PUSCH in the random access procedure or the second slot aggregation level of the PUSCH in the random access procedure that are supported by the network device, random access configuration information, or the first TBS.

7. The method according to claim 6, wherein the random access configuration information comprises at least one of the following information:

preamble information that corresponds to the first slot aggregation level and the second slot aggregation level, random access channel resource information that corresponds to the first slot aggregation level and the second slot aggregation level, the preamble information that corresponds to slot aggregation not being performed for the PUSCH in the random access procedure, or the random access channel resource information that corresponds to slot aggregation not being performed for the PUSCH in the random access procedure.

8. The method according to claim 6, further comprising:

receiving, by the network device, a random access preamble from the terminal; and returning, by the network device, a random access response to the terminal, wherein the random access response comprises at least one of uplink data transmission grant information, timing advance information, a temporary cell radio network temporary identifier, or information indicating whether early data transmission is allowed.

9. The method according to claim 8, further comprising:

determining, by the network device based on the received random access preamble, at least one of the following information:

that the terminal needs to perform early data transmission, whether the terminal sends the PUSCH in the random access procedure in a slot aggregation manner, or the slot aggregation level used by the terminal to send the PUSCH in the random access procedure.

10. An apparatus, comprising:

one or more processors; and a non-transitory memory, wherein the non-transitory memory stores instructions, and when executing the instructions stored in the memory, the apparatus executes operations comprising:

receiving first indication information from a network device, wherein the first indication information comprises slot aggregation information of a physical uplink shared channel (PUSCH) to use in a random access procedure for an early data transmission;

selecting, according to the slot aggregation information of the PUSCH to use in the random access procedure for the early data transmission and a size of first uplink data to send in the early data transmission, preamble information for the random access procedure or resource information for the random access procedure, wherein selecting, according to the slot aggregation information of the PUSCH to use in the random access procedure for the early data transmission and the size of the first uplink data to send in the early data transmission, the preamble information for the random access procedure or the resource information for the random access procedure comprises:

when the size of the first uplink data to send in the early data transmission is not greater than a first transport block size (TBS), selecting, for the random access procedure, preamble information corresponding to slot aggregation not being performed for the PUSCH in the random access procedure or random access channel resource information corresponding to slot aggregation not being performed for the PUSCH in the random access procedure; or when the size of the first uplink data in the early data transmission is greater than the first TBS, less than a product of the first TBS and a first slot aggregation level, and less than a product of the first TBS and a second slot aggregation level, selecting, for the random access procedure, first preamble information corresponding to the first slot aggregation level or first random access channel resource information corresponding to the first slot aggregation level, wherein the first slot aggregation level is less than the second slot aggregation level; and performing early data transmission based on the first indication information.

11. The apparatus according to claim 10, wherein the first indication information comprises at least one of the following information:

whether the network device supports slot aggregation of the PUSCH in the random access procedure, the first slot aggregation level of the PUSCH in the random access procedure or the second slot aggregation level of the PUSCH in the random access procedure that are supported by the network device, random access configuration information, or the first TBS.

12. The apparatus according to claim 11, wherein the random access configuration information comprises at least one of the following information:

preamble information that corresponds to the first slot aggregation level and the second slot aggregation level, random access channel resource information that corresponds to the first slot aggregation level and the second slot aggregation level, the preamble information that corresponds to slot aggregation not being performed for the PUSCH in the random access procedure, or the random access channel resource information that corresponds to slot aggregation not being performed for the PUSCH in the random access procedure.

13. The apparatus according to claim 10, wherein the apparatus executes operations further comprising:

sending, to the network device on a resource selected by the apparatus for the random access procedure, the preamble information selected by the apparatus for the random access procedure.

14. An apparatus, comprising:
one or more processors; and
a non-transitory memory, wherein the memory stores instructions, and when executing the instructions stored in the memory, the apparatus executes operations comprising:
sending first indication information to a terminal, wherein the first indication information comprises slot aggregation information of a physical uplink shared channel (PUSCH) to use in a random access procedure for an early data transmission; and
receiving first uplink data sent by the terminal in the random access procedure, wherein slot aggregation of the PUSCH is used for the random access procedure, and wherein a slot aggregation level used for the early data transmission corresponds to preamble information used in the random access procedure, or the slot aggregation level used for the early data transmission corresponds to a resource used in the random access procedure, and wherein the slot aggregation level used for the early data transmission corresponding to the preamble information used in the random access procedure, or the slot aggregation level used for the early data transmission corresponding to the resource used in the random access procedure, comprises:

when a size of the first uplink data is not greater than a first transport block size (TBS), the preamble information used in the random access procedure corresponds to slot aggregation not being performed for the PUSCH in the random access procedure, or a random access channel resource used in the random access procedure corresponds to slot aggregation not being performed for the PUSCH in the random access procedure; or when the size of the first uplink data is greater than the first TBS, less than a product of the first TBS and a first slot aggregation level, and less than a product of the first TBS and a second slot aggregation level, first preamble information corresponding to the first slot aggregation level is used in the random access procedure, or a first random access channel resource corresponding to the first slot aggregation level is used in the random access procedure, and wherein the first slot aggregation level is less than the second slot aggregation level.

15. The apparatus according to claim 14, wherein the first indication information comprises at least one of the following information:

whether the apparatus supports slot aggregation of the PUSCH in the random access procedure, the first slot aggregation level of the PUSCH in the random access procedure or the second slot aggregation level of the PUSCH in the random access procedure that are supported by the apparatus, random access configuration information, or the first TBS.

16. The apparatus according to claim 15, wherein the random access configuration information comprises at least one of the following information:

preamble information that corresponds to the first slot aggregation level and the second slot aggregation level, random access channel resource information that corresponds to the first slot aggregation level and the second slot aggregation level, the preamble information that corresponds to slot aggregation not being performed for the PUSCH in the random access procedure, or the random access channel resource that corresponds to slot aggregation not being performed for the PUSCH in the random access procedure.

17. The apparatus according to claim 15, wherein the apparatus executes operations further comprising:
receiving a random access preamble from the terminal; and
returning a random access response to the terminal, wherein the random access response comprises at least one of uplink data transmission grant information, timing advance information, a temporary cell radio network temporary identifier, or information indicating whether early data transmission is allowed.

18. The apparatus according to claim 17, wherein the apparatus executes operations further comprising:
determining, based on the random access preamble, at least one of the following information:
the terminal needs to perform early data transmission, whether the terminal sends the PUSCH in the random access procedure in a slot aggregation manner, or the slot aggregation level used by the terminal to send the PUSCH in the random access procedure.

\* \* \* \* \*